US00RE51113E

(19) United States
(12) Reissued Patent
Kishigami

(10) Patent Number: US RE51,113 E
(45) Date of Reissued Patent: *Nov. 10, 2026

(54) RADAR APPARATUS AND RADAR METHOD

(71) Applicant: Panasonic Holdings Corporation, Osaka (JP)

(72) Inventor: Takaaki Kishigami, Tokyo (JP)

(73) Assignee: Panasonic Automotive Systems Co., Ltd., Kanagawa (JP)

( * ) Notice: This patent is subject to a terminal disclaimer.

(21) Appl. No.: 18/582,322

(22) Filed: Feb. 20, 2024

Related U.S. Patent Documents

Reissue of:
(64) Patent No.: 10,641,882
Issued: May 5, 2020
Appl. No.: 15/908,986
Filed: Mar. 1, 2018

U.S. Applications:
(63) Continuation of application No. 17/706,418, filed on Mar. 28, 2022, now Pat. No. Re. 49,920, which is an application for the reissue of Pat. No. 10,641,882.

(30) Foreign Application Priority Data

Mar. 7, 2017 (JP) ..... 2017-043079

(51) Int. Cl.
*G01S 13/10* (2006.01)
*G01S 7/02* (2006.01)
(Continued)

(52) U.S. Cl.
CPC ..... *G01S 7/0234* (2021.05); *G01S 7/023* (2013.01); *G01S 7/288* (2013.01); *G01S 7/2921* (2013.01);
(Continued)

(58) Field of Classification Search
CPC ..... G01S 7/0234; G01S 7/023; G01S 7/288; G01S 7/2921; G01S 13/04; G01S 13/106; G01S 13/288; G01S 13/86
See application file for complete search history.

(56) References Cited

U.S. PATENT DOCUMENTS 4,539,565 A * 9/1985 Norsworthy ..... G01S 7/4008 342/128
4,652,883 A * 3/1987 Andricos ..... H01Q 3/385 333/139
(Continued)

FOREIGN PATENT DOCUMENTS

JP 2-243022 A 9/1990
JP H02243022 A 9/1990
(Continued)

OTHER PUBLICATIONS

Machine Translation of JP2017-032522.*
(Continued)

*Primary Examiner* — William H. Wood
(74) *Attorney, Agent, or Firm* — Seed Intellectual Property Law Group LLP

(57) ABSTRACT

A radar apparatus includes a radar transmitter that transmits a radar signal in a predetermined transmission cycle and a radar receiver that receives a reflection wave signal being a reflection of the radar signal on a target. The radar transmitter includes a phase rotation controller that randomly varies a pattern of a phase rotation every period corresponding to a plurality of transmission cycles, the pattern being to be applied to the radar signal within a period, and a transmission phase rotator that assigns a first phase rotation to the radar signal in accordance with the pattern. The radar receiver includes a reception phase rotator that assigns a second phase rotation in a direction opposite to a direction of the first phase rotation to the reflection wave signal in accordance with the pattern.

6 Claims, 8 Drawing Sheets

(51) Int. Cl.

| | |
|---|---|
| ***G01S 7/288*** | (2006.01) |
| ***G01S 7/292*** | (2006.01) |
| ***G01S 13/04*** | (2006.01) |
| ***G01S 13/28*** | (2006.01) |
| ***G01S 13/86*** | (2006.01) |

(52) U.S. Cl.

CPC ..... *G01S 13/04* (2013.01); *G01S 13/106* (2013.01); *G01S 13/288* (2013.01); *G01S 13/86* (2013.01)

(56) References Cited

U.S. PATENT DOCUMENTS

| | | | | |
|---|---|---|---|---|
| 5,151,702 | A * | 9/1992 | Urkowitz | G01S 13/284 342/116 |
| 5,289,188 | A * | 2/1994 | Chudleigh, Jr. | G01S 13/288 342/132 |
| 8,040,935 | B2 * | 10/2011 | Song | H04B 1/707 375/146 |
| 8,548,033 | B2 * | 10/2013 | Nemeth | H04L 27/0014 375/219 |
| 9,094,004 | B2 * | 7/2015 | Hsieh | H03K 19/017509 |
| 9,571,317 | B1 * | 2/2017 | Kossin | H04L 27/20 |
| 2008/0100499 | A1 * | 5/2008 | Nishimura | G01S 13/34 342/75 |
| 2012/0163426 | A1 * | 6/2012 | Nemeth | H04L 27/0014 375/219 |
| 2012/0223855 | A1 * | 9/2012 | Kurono | G01S 7/2925 342/146 |
| 2013/0079060 | A1 * | 3/2013 | Pivit | H01Q 3/267 455/561 |
| 2013/0113653 | A1 * | 5/2013 | Kishigami | G01S 7/285 342/189 |
| 2013/0120185 | A1 * | 5/2013 | Kishigami | G01S 7/2813 342/146 |
| 2014/0111367 | A1 * | 4/2014 | Kishigami | G01S 7/2813 342/21 |
| 2014/0348217 | A1 * | 11/2014 | Hsieh | H03K 19/017509 375/219 |
| 2015/0061915 | A1 * | 3/2015 | Kishigami | G01S 7/023 342/27 |
| 2015/0123840 | A1 * | 5/2015 | Morita | G01S 7/02 342/175 |
| 2015/0198710 | A1 * | 7/2015 | Tokuhiro | G01S 13/36 342/104 |
| 2015/0369912 | A1 * | 12/2015 | Kishigami | G01S 13/26 342/113 |
| 2016/0211953 | A1 * | 7/2016 | Ezaki | H04L 27/0014 |
| 2016/0212616 | A1 * | 7/2016 | Allen | H04W 12/04 |
| 2017/0212213 | A1 | 7/2017 | Kishigami | |
| 2017/0254879 | A1 | 9/2017 | Tokieda et al. | |

FOREIGN PATENT DOCUMENTS

| | | | |
|---|---|---|---|
| JP | 2000-338226 | A | 12/2000 |
| JP | 2008020221 | A | 1/2008 |
| JP | 2008236740 | A | 10/2008 |
| JP | 2014020970 | A | 2/2014 |
| JP | 2016050778 | A | 4/2016 |
| JP | 2017032522 | A | 2/2017 |
| JP | 7500665 | B2 | 6/2024 |

OTHER PUBLICATIONS

English Translation of Japanese Notice of Reasons for Refusal, dated Dec. 24, 2024, for Japanese Patent Application No. 2024-090833. (3 pages).

Japanese Notice of Reasons for Refusal, dated Jan. 5, 2021, for Japanese Application No. 2017-043079, 10 pages. (with machine translation).

Japanese Office Action, dated Aug. 22, 2023, for Japanese Patent Application No. 2022-123226. (6 pages) (with English translation).

S. Z. Budisin, "New complementary pairs of sequences," Electronics Letters, vol. 26, No. 13, Jun. 21, 1990, p. 881-883.

English Translation of Notice for Reasons for Refusal, dated Nov. 18, 2025, for Japanese Patent Application No. 2025-074336. (4 pages).

Yoshimasa Egashira et al., "A novel IQ imbalance compensation method with pilot-signals for OFDM system", IEICE transaction B, vol. J91-B, No. 5, May 1, 2008, pp. 558-565 (Partial Translation).

Eric Spano et al., "Sequences of complementary codes for the optimum decoding of truncated ranges and high sidelobe suppression factors for ST/MST radar systems", IEEE Transactions on Geoscience and Remote Sensing, vol. 34, No. 2, Mar. 1, 1996, pp. 330-345.

* cited by examiner

RADAR APPARATUS AND RADAR METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO CO-PENDING REISSUE APPLICATION*

*More than one reissue application has been filed for reissue of U.S. Pat. No. 10,641,882, issued May 5, 2020. This application and U.S. patent application No. 17/706,418, filed Mar. 28, 2022, are both applications for reissue of U.S. Pat. No. 10,641,882. This application is also a continuing reissue application of U.S. patent application No. 17/706,418, which is an application for reissue of U.S. Pat. No. 10,641,882.*

BACKGROUND

1. Technical Field

The present disclosure relates to a radar apparatus and a radar method.

2. Description of the Related Art

In recent years, studies have been advancing on radar apparatuses using short-wavelength radar transmission signals, including microwaves or millimeter waves, which may achieve high resolution. On the other hand, in order to improve the safety outdoors, there is a demand for development of radar apparatuses (wide-angle radar apparatuses) to detect objects (targets) including not only vehicles but also pedestrians in a wide range of angle.

As such radar apparatuses, pulse-compression radar apparatuses are known, for example. In the case of detection of vehicles and pedestrians by a pulse-compression radar, reflection waves from pedestrians are much weaker than reflection waves from vehicles. Accordingly, the radar transmitter is required to have a transmission configuration to transmit pulse-compression waves with low range sidelobes, and the radar receiver is required to have a reception configuration including a wide dynamic range of reception.

For example, it is known to use, as the pulse compression codes to provide low-level range sidelobe characteristics, Barker codes, PN sequence codes, complementary codes, or the like. The following description is given of a case using complementary codes as an example. Complementary codes are composed of paired codes (hereinafter, referred to as complementary codes $a_n$ and $b_n$. Herein, n=1, . . . , L. L is a code length). The autocorrelation operations of the two codes are expressed by the following expressions (1) and (2), respectively.

$$R_{aa}(\tau) = \sum_{n=1}^{L} a_n a_{n+\tau}^* \tag{1}$$

$$R_{bb}(\tau) = \sum_{n=1}^{L} b_n b_{n+\tau}^* \tag{2}$$

In expressions (1) and (2), $a_n=0$ and $b_n=0$ where n>L and n<1. When the results of the autocorrelation operations for the two codes are added up with the same shift time τ, the correlated value is 0 where τ is not 0 as illustrated in the following expression (3). It means that the complementary code has zero range sidelobes thereof.

$$\sum_{n=1}^{L} a_n \neq 0 \tag{4}$$

One of known pulse compression radars transmit the complementary codes $a_n$ and $b_n$ every predetermined radar transmission cycle in a time division manner.

One of the methods to generate complementary codes is disclosed in Budisin, S. Z., "New complementary pairs of sequences," Electron. Lett., 1990, 26, (13), pp. 881-883). According to this literature, complementary codes with code lengths L=4, 8, 16, 32, . . . , $2^P$ are sequentially generated based on codes $A=[a_1, a_2]=[1, 1]$ and $B=[b_1, b_3]=[1, -1]$, which are composed of elements 1 or −1 and have complementarity, for example. Pulse compression radars repeatedly transmit the aforementioned pulse compression codes a predetermined number of times in every radar transmission cycle to increase the reception level of radar reflection waves.

When the aforementioned pulse compression radar is configured to use a radio frequency band (RF band), such as millimeter-waves, an RF circuit and an analogue baseband circuit of the radar transmitter or receiver of the radar apparatus include circuit errors, which results in a lower radar detection performance (or low radar ranging performance) compared with the ideal characteristics obtained when no circuit errors are included.

SUMMARY

One non-limiting and exemplary embodiment provides a radar apparatus and a radar method in which the radar detection performance is prevented from degrading due to circuit errors.

In one general aspect, the techniques disclosed here feature a radar apparatus, including: a radar transmitter which transmits a radar signal in a predetermined transmission cycle; and a radar receiver which receives a reflection wave signal being a reflection of the radar signal on a target. The radar transmitter includes a phase rotation controller which randomly varies a pattern of a phase rotation amount every period corresponding to a plurality of transmission cycles, the pattern being to be applied to the radar signal within a period; and a transmission phase rotator which assigns a first phase rotation to the radar signal in accordance with the pattern. The radar receiver includes a reception phase rotator which assigns a second phase rotation in a direction opposite to a direction of the first phase rotation to the reflection wave signal in accordance with the pattern.

It should be noted that general or specific embodiments may be implemented as a system, a method, an integrated circuit, a computer program, a storage medium, or any selective combination thereof.

According to the aspect of the disclosure, it is possible to suppress degradation of the radar detection performance due to circuit errors.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
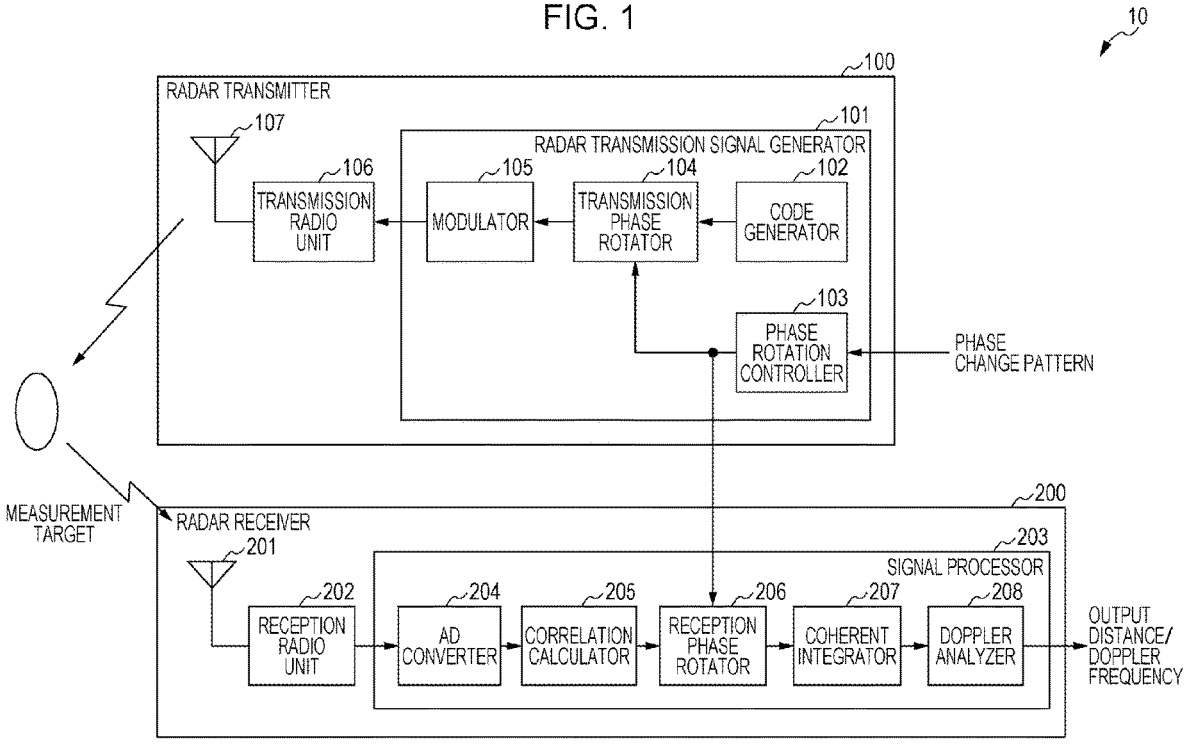
FIG. 1 is a block diagram illustrating a configuration example of a radar apparatus according to Embodiment 1 of the disclosure.

Circuit errors that can occur in a radar apparatus are: IQ mismatch, DC offsets, and the like in a quadrature modulator and a quadrature demodulator; phase noise in a frequency converter; and quantization noise in AD and DA converters.

When the DC offset is included as a circuit error, a phenomenon generating a noise level higher than a case free of the circuit error occurs. For this reason, when a wave reflected from the target is lower than the noise level, the radar apparatus is unable to detect the target. This leads to drop of the detection ratio and deterioration of radar detection performance.

To solve the problem, methods of removing the DC offset by a circuit configuration including a radar transmitter or a radar receiver have been proposed conventionally. Specifically, Japanese Patent Application Publication No. 2-243022 discloses a configuration with a bypass filter arranged for discrete data outputted from an AD converter to remove the DC offset. Japanese Patent Application Publication No. 2000-338226 discloses a configuration with a bandpass filter arranged in an input stage of an AD converter to remove the DC offset. Moreover, a circuit configuration to correct an IQ imbalance circuit error is disclosed in Egashira, et al., "A novel IQ imbalance compensation method with pilot-signals for OFDM system," IEICE transaction B, Vol. J91-B, No. 5, pp. 558-565, 2008.

However, the related arts disclosed by Japanese Patent Application Publication Nos. 2-243022 and 2000-338226 need installation of a DC offset removal circuit or a correction circuit for the IQ imbalance circuit error, which complicates the circuit configuration. Also, in a case where a bypass filter or bandpass filter is provided for DC offset removal, a desired radar reflected wave component other than the DC offset component may be weakened or a filter response may cause an amplitude distortion or a phase distortion, and thereby radar detection performance deteriorates.

Even in a configuration with the DC offset removal circuit, if the DC offset component or the IQ imbalance component is not removed completely and thereby a circuit error component remains, the circuit error component is also integrated by a coherent integration processing in a radar reception processing, and this results in deteriorating radar detection performance. For example, if even a small amount of the residual circuit error component is included, the residual component increases to 30 to 40 dB due to integration effects. This necessitates a high precision error detection mechanism, which complicates a hardware configuration of the radar apparatus.

Meanwhile, a radar apparatus that cancels the reception DC offset component by transmitting a code including a combination of phase modulations in a plurality of pulse transmission cycles to subject the reflected wave to the coherent integration processing is disclosed in E. Spano and O. Ghebrebrhan, "Sequences of complementary codes for the optimum decoding of truncated ranges and high sidelobe suppression factors for ST/MST radar systems," IEEE Transactions on Geoscience and Remote Sensing, Vol. 34, No. 2, pp. 330-345, 1996.

As an example, a principle of canceling the reception DC offset component is illustrated hereinafter. In the principle, a code $A=[a_1, a_2, \ldots, a_L]$ used for pulse compression and a code $-A=[-a_1, -a_2, \ldots, -a_L)$ phase-inverted at 180 degrees from the code A are transmitted from a transmission side of a radar apparatus, and a reception side of the radar apparatus cancels the reception DC offset by the coherent integration.

Hereinafter, description is given on a case where there is no noise component and the sum of elements of the code A is not zero as shown in the following expression (4).

$$R_A(\tau) = \sum_{n=1}^{L}(\gamma a_n + \alpha_{Rx})a_{n+\tau}^* = \gamma\sum_{n=1}^{L}a_n a_{n+\tau}^* + \alpha_{Rx}\sum_{n=1}^{L}a_n^* \tag{5}$$

Example 1: When Reception Signal of the Radar Reflection Wave Includes Reception DC Offset Component (1-1) When transmitting the code A, reception signal $(\gamma A+\alpha_{Rx})$ of the code A including the reception DC offset component $\alpha_{Rx}$ and autocorrelation value obtained by autocorrelation operation with the code A are expressed by the following expression (5).

$$R_{(-A)}(\tau) = \sum_{n=1}^{L}(-\gamma a_n + \alpha_{Rx})(-a_{n+\tau}^*) = \gamma\sum_{n=1}^{L}a_n a_{n+\tau}^* - \alpha_{Rx}\sum_{n=1}^{L}a_n^* \tag{6}$$

In the expression (5), $\gamma$ indicates a complex reception signal, and asterisk (*) indicates the complex conjugate operator.

(1-2) When transmitting the code −A, reception signal $(-\gamma A+\alpha_{Rx})$ of the code −A including the reception DC offset component $\alpha_{Rx}$ and the autocorrelation value obtained by autocorrelation operation with the code −A are expressed by the following expression (6).

$$R_A(\tau) + R_{(-A)}(\tau) = 2\gamma\sum_{n=1}^{L} a_n a_{n+\tau}^* \tag{7}$$

When the autocorrelation value (expression (5)) obtained in the above (1-1) only is subjected to the coherent integration processing on the reception side, two terms including the reception DC offset component $\alpha_{Rx}$ are integrated even when $\gamma$ is zero (or even when radar reflection wave does not exists). For this reason, noise level (floor level) increases across entire distance range, and thereby radar detection performance deteriorates.

On the other hand, when autocorrelation values (expressions (5) and (6)) obtained in the above (1-1) and (1-2) are subjected to the coherent integration processing on the reception side, the reception DC offset component $\alpha_{Rx}$ may be canceled as shown in the expression (7).

$$R_A(\tau) = \sum_{n=1}^{L}\gamma(a_n + \alpha_{Tx})a_{n+\tau}^* = \gamma\sum_{n=1}^{L} a_n a_{n+\tau}^* + \gamma\alpha_{Tx}\sum_{n=1}^{L} a_n^* \tag{8}$$

This inhibits increase of the noise level and suppresses deterioration of radar detection performance of the radar apparatus. In the same manner, the reception DC offset component $\alpha_{Rx}$ in a reception signal of the radar reflection wave including Doppler fluctuation may be canceled, and thereby increase of the noise level (floor level) may be inhibited and deterioration of radar detection performance may be suppressed.

Example 2: When Reception Signal of the Radar Reflection Wave not Including Doppler Fluctuation Includes Transmission DC Offset Component $\alpha_{Tx}$ (2-1) When transmitting the code A, a reception signal ($\gamma A+\alpha_{Tx}$) including the transmission DC offset component $\alpha_{Tx}$ and an autocorrelation value obtained by autocorrelation operation with the code A are expressed by the following expression (8).

$$R_{(-A)}(\tau) = \sum_{n=1}^{L}\gamma(-a_n + \alpha_{Tx})(-a_{n+\tau}^*) = \gamma\sum_{n=1}^{L} a_n a_{n+\tau}^* - \gamma\alpha_{Tx}\sum_{n=1}^{L} a_n^* \tag{9}$$

(2-2) When transmitting the code −A, a reception signal ($-\gamma A+\alpha_{Tx}$) including the transmission DC offset component $\alpha_{Tx}$ and an autocorrelation value obtained by autocorrelation operation with the code −A are expressed by the following expression (9).

$$R_A(\tau) = \sum_{n=1}^{L}\gamma(a_n + \alpha\tau_\lambda)a_{n+\tau}^* = \gamma\sum_{n=1}^{L} a_n a_{n+\tau}^* + \gamma\alpha\tau_\lambda\sum_{n=1}^{L} a_n^* \tag{10}$$

When autocorrelation values (expressions (8) and (9)) obtained in the above (2-1) and (2-2) are subjected to the coherent integration processing on the reception side, the transmission DC offset component αRx is canceled in the same manner as the <example 1> where the reception DC αRx is included, and thereby increase of the noise level (floor level) may be inhibited and deterioration of radar detection performance may be suppressed.

As described in <Example 1> and <Example 2>, deterioration of radar detection performance may be suppressed by canceling the transmission DC offset component or the reception DC offset component.

However, even in the above method, when a transmission DC offset component (including a carrier leak component) exists in the radar transmitter and there is a Doppler fluctuation in the radar reflection wave, the transmission DC offset component remains. This is because, in the above method, a cancellation error occurs due to Doppler fluctuation of the transmission DC offset component. Thus, noise level of the Doppler component included in a residual transmission DC offset component may increase, and thereby radar detection performance may deteriorate.

Hereinafter, a case where the Doppler fluctuation is included in the radar reflection wave is described.

Example 3: When Reception Signal of the Radar Reflection Wave Including Doppler Fluctuation Includes Transmission DC Offset Component $\alpha_{Tx}$ Here, the Doppler fluctuation included in the radar reflection wave is "$\exp(j2\pi f_d \times T_r)=\exp(j\Phi_d)$" ($f_d$: Doppler frequency, $T_r$: radar transmission cycle, provided that Doppler fluctuation in the code is deemed constant).

(3-1) When transmitting the code A, a reception signal $\gamma(A+\alpha_{Tx})$ including the transmission DC offset component $\alpha_{Tx}$ and an autocorrelation value obtained by autocorrelation operation with the code A are expressed by the following expression (10).

$$R_{(-A)}(\tau) = \sum_{n=1}^{L}[\gamma(-a_n + \alpha_{Tx})\exp(j\psi_d)](-a_{n+\tau}^*) = \gamma\exp(j\psi_d)\sum_{n=1}^{L} a_n a_{n+\tau}^* - \gamma\alpha_{Tx}\exp(j\psi_d)\sum_{n=1}^{L} a_n^* \tag{11}$$

(3-2) When transmitting the code −A, a reception signal $\gamma(-A+\alpha_{Tx})\exp(j\Phi_d)$ including the transmission DC offset component $\alpha_{Tx}$ and an autocorrelation value obtained by autocorrelation operation with the code −A are expressed by the following expression (11).

$$R_A(\tau) + R_{(-A)}(\tau) = \gamma\{1 + \exp(j\psi_d)\}\sum_{n=1}^{L} a_n a_{n+\tau}^* + \gamma\alpha_{Tx}\{1 - \exp(j\psi_d)\}\sum_{n=1}^{L} a_n^* \tag{12}$$

On the reception side, when autocorrelation values (expressions (10) and (11) obtained in the above (3-1) and (3-2) are subjected to the coherent integration processing, two items including the transmission DC offset component $\alpha_{Tx}$ are integrated depending on $\gamma$.

$$R_A^{(1)}(\tau) = \sum_{n=1}^{L}\gamma(a_n + \alpha_{Tx})a_{n+\tau}^* = \gamma\sum_{n=1}^{L} a_n a_{n+\tau}^* + \gamma\alpha_{Tx}\sum_{n=1}^{L} a_n^* \tag{13}$$

In general, a coherent integration processing using the Doppler frequency analysis is applied to the reception processing of the radar reflection wave including the Doppler fluctuation. Thus, noise level (floor level) of a Doppler frequency component corresponding to two terms of the expression (12) increases, and thereby radar detection performance deteriorates. Reception power of the transmission DC offset component $\alpha_{Tx}$ is proportionate with $|\gamma\alpha_{Tx}|^2$. Thus, larger the reception power of the radar reflection wave, higher the noise level (floor level) and more deteriorating the radar detection performance.

Next, description is given on a method of inhibiting increase of the noise level (floor level) and suppressing deterioration of radar detection performance without adding a high precision correction circuit for circuit error correction even when a pulse compression radar includes a transmission DC offset (carrier leak) and a reception DC offset.

In the above method of transmitting pulse compression codes to which phase modulation is applied in a plurality of pulse transmission cycles, when a transmission DC offset component (including a carrier leak component) exists in the radar transmitter, Doppler fluctuation in the radar reflection wave causes the transmission DC offset component to remain and thereby noise level of a specific Doppler component increases. In this case, the transmission DC offset component may be reduced by a method described below.

Specifically, this is a method in which the radar apparatus transmits codes A, −A, −A, and A in four radar transmission cycles respectively using the code A="$a_1, a_2, \ldots, a_L$" used for pulse compression and the code −A="$-a_1, -a_2, \ldots, -a_L$" phase-inverted from the code A from the transmission side, and the reception side correlates the codes to each other to perform coherent integration.

Hereinafter, this method is described specifically. In the same manner as the above, description is given on the case where there is no noise component and the sum of elements of the code A is not zero (see the expression (4)).

Example 4: When Reception Signal of the Radar Reflection Wave Including Doppler Fluctuation Includes Transmission DC Offset Component $\alpha_{Tx}$ Here, the Doppler fluctuation included in the radar reflection wave is "$\exp(j2\pi f_d \times T_r)=\exp(j\Phi_d)$" ($f_d$: Doppler frequency, $T_r$: radar transmission interval, provided that Doppler fluctuation in the code is deemed constant).

(4-1) When transmitting the code A, a reception signal $\gamma(A+\alpha_{Tx})$ including the transmission DC offset component $\alpha_{Tx}$ and an autocorrelation value obtained by autocorrelation operation with the code A are expressed by the following expression (13).

$$R^{(1)}_{(-A)}(\tau) = \sum_{n=1}^{L}\gamma[(-a_n+\alpha_{Tx})\exp(j\psi_d)](-a^*_{n+\tau}) = \gamma\exp(j\psi_d)\sum_{n=1}^{L}a_n a^*_{n+\tau} - \gamma\alpha_{Tx}\exp(j\psi_d)\sum_{n=1}^{L}a^*_n \tag{14}$$

(4-2) When transmitting the code −A, a reception signal $\gamma(-A+\alpha_{Tx})\exp(j\Phi_d)$ of the code −A including the transmission DC offset component $\alpha_{Tx}$ and an autocorrelation value obtained by autocorrelation operation with the code −A are expressed by the following expression (14).

$$R^{(2)}_{(-A)}(\tau) = \sum_{n=1}^{L}\gamma[(-a_n+\alpha_{Tx})\exp(j2\psi_d)](-a^*_{n+\tau}) = \gamma\exp(j2\psi_d)\sum_{n=1}^{L}a_n a^*_{n+\tau} - \gamma\alpha_{Tx}\exp(j2\psi_d)\sum_{n=1}^{L}a^*_n \tag{15}$$

(4-3) When transmitting the code −A, a reception signal $\gamma(-A+\alpha_{Tx})\exp(j2\Phi_d)$ including the transmission DC offset component $\alpha_{Tx}$ and an autocorrelation value obtained by autocorrelation operation with the code −A are expressed by the following expression (15).

$$R^{(2)}_{(A)}(\tau) = \sum_{n=1}^{L}\gamma[(a_n+\alpha_{Tx})\exp(j3\psi_d)](a^*_{n+\tau}) = \gamma\exp(j3\psi_d)\sum_{n=1}^{L}a_n a^*_{n+\tau} + \gamma\alpha_{Tx}\exp(j3\psi_d)\sum_{n=1}^{L}a^*_n \tag{16}$$

(4-4) When transmitting the code A, a reception signal $\gamma(A+\alpha_{Tx})\exp(j3\Phi_d)$ of the code A including the transmission DC offset component $\alpha_{Tx}$ and an autocorrelation value obtained by autocorrelation operation with the code A are expressed by the following expression (16).

$$\begin{aligned} R^{(1)}_{A}(\tau) + R^{(1)}_{(-A)}(\tau) + R^{(2)}_{(-A)}(\tau) + R^{(2)}_{A}(\tau) &= \\ \{1+\exp(j\psi_d)+\exp(2j\psi_d)+\exp(3j\psi_d)\}\gamma\sum_{n=1}^{L}a_n a^*_{n+\tau} &+ \\ \alpha_{Tx}\{1-\exp(j\psi_d)-\exp(2j\psi_d)+\exp(3j\psi_d)\}\gamma\sum_{n=1}^{L}a^*_n &= \\ \{1+\exp(j\psi_d)+\exp(2j\psi_d)+\exp(3j\psi_d)\}\gamma\sum_{n=1}^{L}a_n a^*_{n+\tau} &+ \\ \alpha_{Tx}\{1-\exp(j\psi_d)\}\{1-\exp(2j\psi_d)\}\gamma\sum_{n=1}^{L}a^*_n \end{aligned} \tag{17}$$

On the reception side, when autocorrelation values (expressions (13) to (16)) obtained in the above (4-1) to (4-4) are subjected to the coherent integration processing, two items including the transmission DC offset component $\alpha_{Tx}$ are integrated as shown in the following expression (17) depending on $\gamma$.

$$AC(k, m) = \sum_{n=1}^{L}X(N_v(m-1)N_o(n-1)/N_{TR}+k)C_n(m)^* \tag{24}$$

In the expression (17), Doppler phase fluctuation$\Phi_d$ in a range smaller than $\pi 6$ is "$|1-\exp(j2\Phi_d)|<1$". Thus, the residual component of the transmission DC offset may be reduced more than the case shown in <Example 3> (see the expression (12)). However, even in the case of <Example 4>, the residual component of the transmission DC offset may not be canceled completely.

As described above, the coherent integration processing using the Doppler frequency analysis is applied to the reception processing of the radar reflection wave included in the Doppler fluctuation. This increases noise level (floor level) of the Doppler frequency component including a residual transmission DC offset component (two terms of expression (17)), and thereby radar detection function deteriorates. For example, as described in <Example 4>, the transmission side transmits codes A, −A, −A, and A in each of four radar transmission cycles, and the reception side performs correlation reception processing of the radar reflection wave by the transmission codes, subjects each pair of transmission codes (A, −A) canceling the reception DC offset to the coherent integration processing in each of two radar transmission cycles, and performs Doppler frequency analysis of the output thereof. In this case, noise level (floor level) of the Doppler frequency component included in the residual transmission DC offset component increases, and thereby radar detection function deteriorates.

Here, in the Doppler frequency analysis, the residual transmission DC offset component increases noise level (floor level) of a specific frequency component since output of the coherent integration processing has a fixed phase fluctuation.

To solve this problem, according to one aspect of the disclosure, the reception side applies a random phase fluctuation to the output of the coherent integration processing for a pair of transmission codes (A, −A) that cancel the reception DC offset such that output of the coherent integration processing does not have a fixed phase fluctuation.

Specifically, when performing the coherent integration processing using the Doppler frequency analysis on the reception side, the radar apparatus according to one aspect of the disclosure randomly changes over to a phase-inverted code (code with the phase changed by π) for each pair of a plurality of transmission codes that cancels the reception DC offset (in the cases of above <Example 1> to <Example 4>, codes corresponding to A and −A which are transmitted in two radar transmission cycles) such that the Doppler frequency fluctuation does not become a stationary phase shift amount (phase change amount).

This varies the phase fluctuation of the output of coherent integration processing to the radar reflection wave for each of the pair of transmission codes, and thereby the residual transmission DC offset component may be whitened in the Doppler frequency region. This inhibits increase of noise level of a specific Doppler frequency component and suppresses deterioration of radar detection function.

Hereinafter, a description is given of embodiments according to an aspect of the disclosure in detail with reference to the drawings. In the embodiments, the same constituent elements are given the same reference numerals, and the description thereof is redundant and omitted.

Embodiment 1

[Configuration of Radar Apparatus]

FIG. 1 is a block diagram illustrating the configuration of a radar apparatus 10 according to Embodiment 1.

The radar apparatus 10 includes a radar transmitter 100 and a radar receiver 200.

The radar transmitter 100 generates a high frequency (radio frequency) radar signals (radar transmission signals). The radar transmitter 100 transmits the radar transmission signals in each predetermined transmission cycle.

The radar receiver 200 receives a reflection wave signal which is a reflection of the radar transmission signal on the measurement target. The radar receiver 200 performs processing in synchronization with the radar transmitter 100 using a reference signal (not illustrated), for example. The radar receiver 200 processes the received reflection wave signal for detection of the presence of the target, direction estimation, and the like, for example. The measurement target is an object to be detected by the radar apparatus 10 and includes vehicles (including four or two wheel vehicles) or human beings, for example.

[Configuration of Radar Transmitter 100]

The radar transmitter 100 includes a radar transmission signal generator 101, a transmission radio unit 106, and a transmission antenna 107.

The radar transmission signal generator 101 modulates a code of a code length L to generate a baseband radar transmission signal (a pulse compression signal) every radar transmission cycle (Tr).

The radar transmission signal generator 101 operates based on transmission reference clocks, the frequency of which is a predetermined multiple of the frequency of the reference signal (not illustrated). Hereinafter, the transmission reference clock frequency is indicated by $f_{TxBB}$. Herein, the radar transmission cycle ($T_r=N_r\times(1/f_{TxBB})$) is an integer Nr times a discrete time interval ($1/f_{TxBB}$) which is determined by the transmission reference clock frequency $f_{TxBB}$ as the predetermined multiple of the reference signal frequency.

The radar transmission signal generator 101 includes a code generator 102 a phase rotation controller 103, a transmission phase rotator 104, and a modulator 105.

Specifically, the code generator 102 generates a transmission code of the code length L every radar transmission cycle ($T_r$). More specifically, the code generator 102 generates a transmission code Code(m) of the code length L in the m-th radar transmission cycle.

Hereinafter, each element of the transmission code(m) is represented as $C_n(m)$. Specifically, the transmission code Code(m) is composed of L elements $\{C_1(m), C_2(m), \ldots, C_L(m)\}$. The transmission code element $C_n(m)$ composes of two values such as $\{-1, 1\}$ and four values such as $\{1, -1, -j, j\}$. Herein, j indicates the imaginary unit. Moreover, n=1, 2, . . . , L, and m=1, 2, . . . , Q. Q indicates the number of radar transmission cycles taken by the radar apparatus 10 to measure the range, the Doppler frequency, the direction of arrival, and the like.

The transmission codes can be Barker codes, complementary codes, M-sequence codes, Gold codes, and the like, that contribute to low range sidelobe characteristics, for example. The transmission codes can be a combination of plural types of codes. The transmission code in each radar transmission cycle may be an identical code or a different code. Alternatively, a plurality of transmission codes may be changed over in each transmission cycle.

For unit period defined by a plurality ($N_e$) of radar transmission cycles ($=N_e\times T_r$), the phase rotation controller 103 outputs phase rotation amounts signal to the transmission phase rotator 104 and a radar receiver 200 (reception phase rotator 206) in order to assign a phase rotation of an integral multiple of 2π ($2\pi N_s$) to the transmission codes within the plurality ($N_e$) of radar transmission cycles. Here, $N_e$ is an integer larger than 1, and $N_s$ is an integer larger than 1.

For the period of the plurality ($N_e$) of radar transmission cycles ($=N_e\times T_r$), the phase rotation controller 103 outputs the phase rotation amount signals such that a predetermined phase shift amount (phase change amount) is achieved between the radar transmission cycles. For example, the phase rotation controller 103 outputs the phase rotation amount signal that cyclically assigns phase rotation amounts $\varphi\times 0$, $\varphi\times 1$, $\varphi\times 2$, . . . , or $\varphi(N_e-1)$ to the respective radar transmission cycles ($T_r$). Here, $\varphi=2\pi N_s/N_e$. For example, when $N_e=4$ and $N_s=1$, the phase shift amount φ in each of radar transmission cycles ($T_r$) is π2. In this case, phase rotation amounts outputted in the respective 4 ($=N_e$) radar transmission cycles ($T_r$) are, for example, 0, $\pi/2$, $\pi$, and $3\pi/2$.

When a complementary code is used as the transmission code (including a case where a plurality of complementary codes are transmitted in combination like a Spano code), the phase shift amount to a pair of codes constituting the complementary code is zero. More specifically, the same phase rotation is assigned to a pair of codes constituting the complementary code. This provides an effect of maintaining high sidelobe suppression characteristics of the complementary code.

For example, when using the complementary code, the phase rotation controller 103 outputs the phase rotation amount signal that cyclically assigns a phase rotation amount $\varphi\times0$, $\varphi\times0$, $\varphi\times1$, $\varphi\times1$, $\varphi\times2$, $\varphi\times2$, . . . , $\varphi(N_e-1)$, $\varphi(N_e-1)$ to every even number ($N_e$) of radar transmission cycles ($T_r$). Here, $\varphi=2\pi N_s/(N_e/2)=4\pi N_s/N_e$. For example, when $N_e=8$ and $N_s=1$, the phase shift amount $\varphi$ is $\pi/2$. In this case, a phase rotation amount outputted in every 8 ($=N_e$) radar transmission cycles ($T_r$) is, for example, 0, 0, $\pi/2$, $\pi/2$, $\pi$, $\pi$, $3\pi/2$, $3\pi/2$.

When the phase shift amount $\varphi$ is $\pi/2$, phase rotation may be implemented by replacing signal components 1 and Q with each other (with conversion of positive and negative codes to each other). Thus, the transmission phase rotator 104 needs no multiplier.

Also, when $N_e/N_s>2$ (in the case of the complementary code, $N_e/N_s>4$) is set, an effect of canceling even DC offset component including signal components 1 and Q may be obtained.

Further, for unit period defined by a plurality ($N_e$) of radar transmission cycles ($=N_e\times T_r$), the phase rotation controller 103 outputs phase rotation amount change signals controlling the phase rotation amount in accordance with a predetermined phase change pattern to the transmission phase rotator 104 and the radar receiver 200 (reception phase rotator 206). In other words, every period ($N_e\times T_r$), the phase rotation controller 103 changes a pattern of a phase rotation amount to be applied to the radar transmission signal within the period ($=N_e\times T_r$) corresponding to a plurality ($N_e$) of radar transmission cycles.

Here, a random pattern fluctuating phase rotation may be used as a phase change pattern. For example, the phase rotation controller 103 controls the phase rotation amount using a pseudo random code (PN code), a M-sequence code, a gold code as a phase change pattern in accordance with the code polarity of respective codes of the phase change pattern.

By way of example, the phase change pattern comprises $N_{pp}$ pieces of elements, and each of the elements comprises two values such as {−1, 1}. Hereinafter, elements of the phase change pattern are represented by PP(q). Here, q=1, 2, . . . , $N_{pp}$. The phase rotation controller 103 sequentially reads elements PP(q) of the phase change pattern and repeatedly outputs a value of the same element over the $N_e$ radar transmission cycles ($=N_e\times T_r$). More specifically, a phase rotation amount change signal PC(m) outputted by the phase rotation controller 103 in an m-th radar transmission cycle is represented by the following expression (18).

$$PC(m)=PP(\mathrm{floor}[(m-1)/N_e]+1) \tag{18}$$

Here, m=1, . . . , $N_e\times N_d$. $N_d$ is a parameter defined by the Doppler analyzer 208 described later. When the number of elements $N_{pp}$ of the phase change pattern is less than Q radar transmission cycles ($=N_e\times N_d$), the phase rotation controller 103 cyclically reads the phase change pattern in the Q radar transmission cycles.

More specifically, the phase change pattern is set such that each element PP(q) is randomly changed for each of a plurality ($N_e$) of radar transmission cycles ($T_r$).

The transmission phase rotator 104 assigns phase rotation to a transmission code outputted from a code generator 102 based on the phase rotation amount signal and the phase rotation amount change signal instructed by the phase rotation controller 103. The transmission phase rotator 104 outputs the transmission code assigned with phase rotation to the modulator 105. For example, as shown in the following expression (19), the transmission phase rotator 104 outputs a signal GP(m) obtained by assigning phase rotation to the transmission code Code(m) outputted from the code generator 102 in an m-th radar transmission cycle.

$$GP(m)=PC(m)\exp[j\{(m-1)\bmod N_e\}\phi]Code(m) \tag{19}$$

Thus, the transmission phase rotator 104 assigns phase rotation to the transmission code (radar transmission signal) in accordance with the phase change pattern (PC(m)).

As described above, when the transmission code is a complementary code, the phase is not shifted (that is, assigning the same phase rotation) between codes constituting a pair of complementary codes to provide an effect of maintaining a characteristic (high sidelobe suppression characteristics) of canceling the distance sidelobe between codes constituting the pair of complementary codes. More specifically, as shown in the following expression (20), when the transmission code is a complementary code, the transmission phase rotator 104 outputs the signal GP(m) obtained by assigning phase rotation to the transmission code Code(m) such that the phase shift between two transmission cycles in which codes constituting a pair of complementary codes are transmitted becomes zero.

$$GP(m)=PC(m)\exp[j\{(\mathrm{floor}((m-1)/2)-1)\bmod N_e\}\phi]\,Code(m) \tag{20}$$

The modulator 105 performs pulse modulation (amplitude modulation (ASK: amplitude shift keying) or phase modulation (PSK: phase shift keying) to the transmission code outputted from the transmission phase rotator 104, and outputs the modulation signal (radar transmission signal) to a transmission radio unit 106.

For example, when the modulator 105 uses phase modulation (PSK), phase modulation of the transmission code compose of two values such as {−1, 1} is BPSK, phase modulation of the transmission code compose of four values such as {1, −1, −j, j} is four-phase PSK, and a predetermined modulation symbol on the IQ phase plane is allocated.

The modulator 105 outputs modulation signal limited within a predetermined band by passing a modulation signal of the modulated transmission code through a band limiting filter (not illustrated).

The modulated signal $G(n_s)$ is represented as the following expression (21) where $I(n_s)$ is the In-phase component of the modulated signal $G(n_s)$ and $Q(n_s)$ is the quadrature component.

$$G(n_s)=I(n_s)+jQ(n_s) \tag{21}$$

Herein, $n_s$ is a natural number and represents a discrete time. The discrete time interval is $1/f_{TxBB}$, and $f_{TxBB}$ is a transmission reference clock frequency which is a predetermined multiple of the reference signal frequency.

Figure 2:
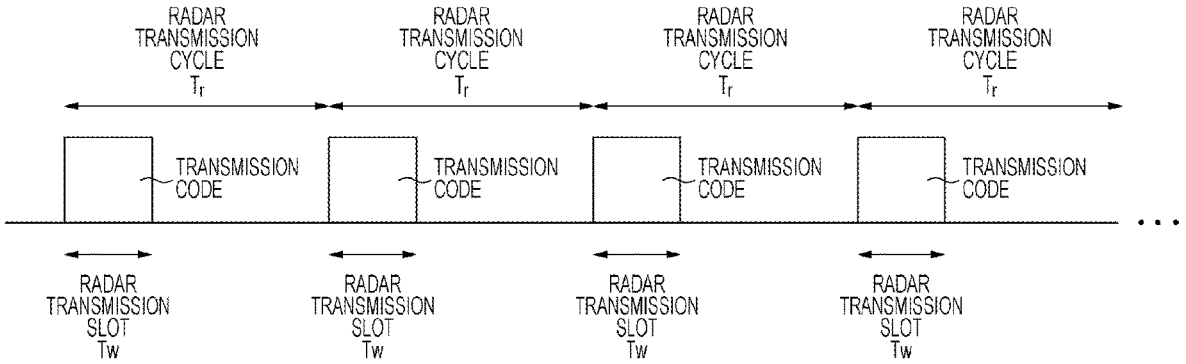
FIG. 2 is a diagram illustrating an example of a radar transmission signal according to the Embodiment 1 of the disclosure.

The modulator 105 modulates the transmission codes outputted from the transmission phase rotator 104 using samples corresponding to $N_o$ transmission reference clocks per code element. For each transmission code of the code length L, Nw ($=N_o \times L$) samples are included in a radar signal slot Tw. The no-signal slot ($T_r$−Tw) in each radar transmission cycle ($T_r$) includes samples corresponding to $N_u$ ($=N_r-$Nw) transmission reference clocks (see FIG. 2, for example). The modulated signal in the m-th radar transmission cycle is represented as the following expression (22).

$$G(N_r(m-1)+n)=I(N_r(m-1)+n)+jQ(N_r(m-1)+n) \quad (22)$$

The transmission radio unit 106 performs quadrature-modulation and frequency conversion for the signals outputted from the modulator 105 to generate the radar transmission signals in a carrier frequency band (radio frequency (RF) band. The transmission radio unit 106 then amplifies the radar transmission signals to a predetermined transmission power through a transmission amplifier and outputs the amplified radar transmission signals to the transmission antenna 107. The transmission antenna 107 radiates the radar transmission signals outputted from the transmission radio unit 106 into space.

To local oscillators included in the transmission radio unit 106 and a later-described reception radio unit 202, the common reference signal is added. The local oscillators of the transmission radio unit 106 and reception radio unit 202 are thereby synchronized.

Figure 3:
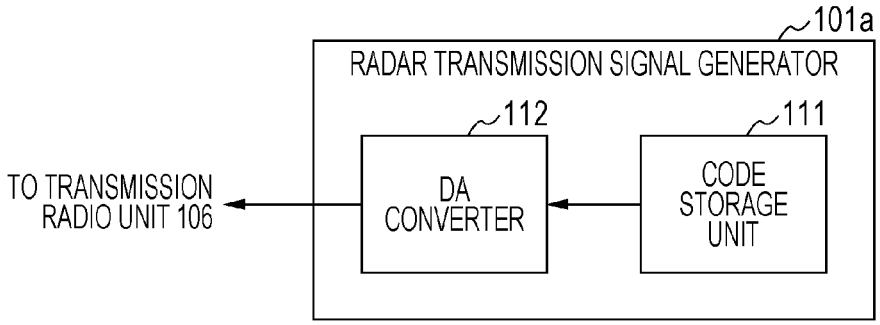
FIG. 3 is a block diagram illustrating another configuration of a radar transmission signal generator according to the Embodiment 1 of the disclosure.

The radar transmitter 100 may include a radar transmission signal generator 101a (illustrated in FIG. 3) instead of the radar transmission signal generator 101. The radar transmission signal generator 101a does not include the phase rotation controller 103, the transmission phase rotator 104, and the modulator 105 illustrated in FIG. 1 but includes a code storage 111 and a DA converter 112 instead. The code storage 111 previously stores a code sequence generated in the code generator 102 (FIG. 1) and sequentially and cyclically reads the stored code sequence. The DA converter 112 converts the code sequence (digital signal) outputted from the code storage 111, to an analogue signal.

[Configuration of Radar Receiver 200]

In FIG. 1, the radar receiver 200 includes a reception antenna 201, the reception radio unit 202, and a signal processor 203.

The reception antenna 201 receives a signal (a reflection wave signal) which is a reflection of a RF radar transmission signal transmitted from the radar transmitter 100 on a reflective object including a measurement target. The reception antenna 201 outputs the received reflection wave signal to the reception radio unit 202 as a reception signal.

The reception radio unit 202 amplifies the reception signal outputted from the reception antenna 201 to a predetermined level and performs frequency conversion for the high-frequency reception signal into a baseband reception signal. The 202 converts the baseband reception signal to a baseband reception signal including an I signal (an In-phase signal component) and a Q signal (a quadrature signal component).

The signal processor 203 includes an AD converter 204, a correlation calculator 205, an reception phase rotator 206, a coherent integrator 207, and a Doppler analyzer 208.

Each component of the signal processor 203 operates based on the reception reference clocks of a frequency which is a predetermined multiple of the frequency of the reference signal (not illustrated). The reception reference clock frequency is indicated by $f_{RxBB}$ below. Herein, each radar transmission cycle ($T_r$) is an integer $N_v$ times a discrete time interval ($1/f_{RxBB}$) which is determined by the reception reference clock frequency $f_{RxBB}$ as the predetermined multiple of the reference signal frequency ($T_r=N_v\times(1/f_{RxBB})$). In the followings, the transmission reference clock frequency $f_{TxBB}$ has a relationship of $f_{TxBB}=f_{RxBB}\times N_{TR}$ (an integer $N_{TR}$ times the reception reference clock frequency $f_{RxBB}$).

The AD converter 204 samples the baseband signal including the I signal and Q signal outputted from the reception radio unit 202 at discrete times ($1/f_{RxBB}$) based on the reception reference clock frequency $f_{RxBB}$ for conversion of the I signal and Q signal to digital data.

In the following description, the baseband reception signal including the I and Q signals at a discrete time k is represented as complex signal $x(k)=I_r(k)+jQ_r(k)$. In the following description, the discrete time k is set to 1 at the time when the m-th radar transmission cycle ($T_r$) starts (k=1). The signal processor 203 cyclically performs measurement until the radar transmission cycle $T_r$ ends. In this case, k=1, . . . , $N_v$. Herein, j is the imaginary number.

The output signal from the AD converter 204 in the m-th radar transmission cycle is represented by the following expression (23). Hereinafter X(k) is called a complex baseband signal.

$$X(N_v(m-1)+k)=I_r(N_v(m-1)+k)+jQ_r(N_v(m-1)+k) \quad (23)$$

The correlation calculator 205 calculates the correlation between the complex baseband signal $X(N_v(m-1)+k)$ outputted from the AD converter 204 and the transmission code $C_n(m)$ transmitted by the radar transmitter 100 every radar transmission cycle $T_r$. Herein, n=1, . . . , L. For example, the correlation value AC(k, m) of sliding correlation operation at the discrete time k in the m-th radar transmission cycle is calculated based on the following expression (24).

$$ACC(k, v) = \sum_{m=1}^{Ne} ACP(k, N_e(v-1)+m) \quad (27)$$

In the expression (24), asterisk (*) indicates the complex conjugate operator. Herein, k=1, . . . , $N_v$.

The measurement range (the range of k) of the correlation operation performed by the correlation calculator 205 is not only k=1, . . . , $N_v$ but also may be limited in accordance with the range where the target as an object to be measured by the radar apparatus 10 can exist. This can reduce the processing amount by the correlation calculator 205 in the radar apparatus 10. For example, the correlation calculator 205 may limit the measurement range to $k=Nw/N_{TR}+1, \ldots, (Nu-Nw)/N_{TR}$. In this case, the radar apparatus 10 does not perform measurement in a time slot corresponding to the code transmission slot Tw.

The process by the correlation calculator 205 is therefore not performed during the period when the radar transmission signal can directly enter the radar receiver 200. Even if radar transmission signals directly enter the radar receiver 200, therefore, the radar apparatus 10 is able to perform measurement without being influenced by the directly received radar transmission signals. In the case of limiting the measurement range (the range of k), the limited measurement range (the range of k) is also applied to the processes in the reception phase rotator 206, coherent integrator 207, and Doppler analyzer 208. This can reduce the processing amount of each constituent components, thus reducing the power consumption in the radar receiver 200.

The reception phase rotator 206 assigns a phase rotation $PC(m)\exp[-j\{m-1)\bmod N_e\}\varphi]$ in the direction opposite to (that cancels) a phase rotation assigned by the transmission phase rotator 104 of the radar transmitter 100 to a signal (correlation operation value) outputted from a correlation calculator 205 in each of radar transmission cycles ($T_r$). More specifically, as shown in the following expression (25), the reception phase rotator 206 outputs a signal ACP(k, m) of an output AC(k, m) of the correlation calculator 205 assigned with a phase rotation, in an m-th radar transmission cycle ($T_r$).

$$ACP(k,m)=PC(m)\exp[-j\{(m-1)\bmod N_e\}\phi]AC(k,m) \tag{25}$$

More specifically, the reception phase rotator 206 assigns a phase rotation in the direction opposite to a phase rotation of the transmission phase rotator 104 to the output AC(k, m) (reflection wave signal) of the correlation calculator 205 in accordance with the phase change pattern (PC(m)).

For example, when $N_e$=4, $N_s$=1, and PC(m)=1, the phase shift amount −φ in each of radar transmission cycles ($T_r$) is −π/2. In this case, phase rotation amounts outputted in the respective 4 (=$N_e$) radar transmission cycles ($T_r$) are, for example, 0, −π/2, −π, and −3π/2. When $N_e$=4, $N_s$=−1, and PC(m)=−1, the phase shift amount −φ in each of radar transmission cycles ($T_r$) is −π/2. However, when PC(m)=−1, from the relation of exp(jπ)=−1, phase rotation amounts outputted in the respective 4 (=$N_e$) radar transmission cycles ($T_r$) are, for example, π, π/2, 0, and −π/2. In other words, the difference between each pair of the phase rotation amounts −φ (here, {0, −π/2, −π, −3π/2} and {π, π/2, 0, −π/2} in different phase change patterns (PC(m)=1, −1) is π.

When a complementary code is used as the transmission code, a pair of codes constituting the complementary code has the same phase. Thus, as shown in the following expression (26), the reception phase rotator 206 outputs the signal ACP(k, m) obtained by assigning a phase rotation to the output AC(k, m) of the correlation calculator 205 such that the phase shift within the transmission cycle of two codes constituting the complementary code becomes zero.

$$ACP(k,m)=PC(m)\exp[-j\{(\mathrm{floor}((m-1)/2)-1)\bmod N_e\}\phi]AC(k,m) \tag{26}$$

For example, when $N_e$=8, $N_s$=1, and PC(m)=1, the phase shift amount −φ is −π/2. Phase rotation amounts outputted in the respective 8 (=$N_e$) radar transmission cycles ($T_r$) are, for example, 0, 0, −π/2, −π/2, −π, −π, −3π/2, and −3π/2. When $N_e$=8, $N_s$=1, and PC(m)=−1, the phase shift amount −φ is −π/2. However, when PC(m)=−1, from the relation of exp (jπ)=−1, phase rotation amounts outputted in the respective 8 (=$N_e$) radar transmission cycles ($T_r$) are, for example, π, π, π/2, π/2, 0, 0. −π/2, and −π/2.

Using the correlation value ACP(k, m) outputted from the reception phase rotator 206 at each discrete time k in the m-th radar transmission cycle (Tr), the coherent integrator 207 adds the correlation value ACP(k, m) at each discrete time k (coherent integration) in a predetermined number $N_e$ of radar transmission cycles, thereby calculating a coherent integral value ACC(k, v) at each discrete time k. Herein, k=1, . . . , $N_v$.

Specifically, the v-th coherent integral value ACC(k, v) is calculated by the following expression (27).

$$\{\alpha_{Tx}\exp(j2\pi f_{dTx}T_r)+\alpha_{Rx}\}\sum_{n=1}^{L}C_n(m)^* \tag{28}$$

Here, when the period of the radar transmission cycles in which the coherent integrator 207 adds the correlation operation value ACP(k, v) at discrete times k (or an integration period of the coherent integrator 207) is set to a predetermined number $N_e$, the reception DC offset component may be canceled by a principle described below even when the reception DC offset is included in the correlation operation value ACP(k, v), and thereby noise components may be suppressed, and deterioration of radar detection performance by the reception DC offset may be inhibited.

More specifically, when the reception DC offset component $\alpha_{Rx}$ and the transmission DC offset component $\alpha_{Tx}\exp(j2\pi f_{dTx}\times T_r)$ including the Doppler frequency fluctuation $f_{dTx}$ are included, the output AC(k, m) of the correlation calculator 205 includes components shown in the following expression (28) irrespective of k and m.

$$PC(m)\exp[-j\{(m-1)\bmod N_e\}\phi]\left[\{\alpha_{Tx}\exp(j2\pi f_{dTx}T_r)+\alpha_{Rx}\}\sum_{n=1}^{L}C_n(m)^*\right] \tag{29}$$

The output ACP(k, m) of the reception phase rotator 206 includes components shown in the following expression (29) irrespective of k.

$$\begin{aligned}&\sum_{m=1}^{Ne}PC\Big(N_e(v-1+m)\exp[-j\{(m-1)\bmod N_e\}\phi]\\&\quad\Big[\{\alpha_{Tx}\exp(j2\pi(N_e(v-1)+m-1)f_{dTx}T_r)+\alpha_{Rx}\}\\&\quad\sum_{n=1}^{L}C_n(N_e(v-1)+m)^*\Big]=\\&\quad PC(N_e(v-1)+m)\sum_{m=1}^{Ne}\exp[-j\{(m-1)\bmod N_e\}\phi]\\&\quad\Big[\{\alpha_{Tx}\exp(j2\pi(N_e(v-1)+m-1)f_{dTx}T_r)+\alpha_{Rx}\}\\&\quad\sum_{n=1}^{L}C_n(N_e(v-1)+m)^*\Big]\end{aligned} \tag{30}$$

Therefore, the output ACC(k, v) of the coherent integrator 207 includes components shown in the following expression (30) irrespective of k.

$$\sum_{n=1}^{L}C_n(m)^* \tag{31}$$

$$\sum_{m=1}^{Ne}\exp[-j\{(m-1)\bmod N_e\}\phi]=0 \tag{32}$$

As shown in the expression (30), in the integration period of the coherent integrator 207, if the following expression (31) is constant, the following expression (32) is satisfied.

$$\begin{aligned}&PC(N_e(v-1)+m)\sum_{m=1}^{Ne}\exp[-j\{(m-1)\bmod N_e\}\phi]\\&\Big[\{\alpha_{Tx}\exp(j2\pi(N_e(v-1)+m-1)f_{dTx}T_r)\}\sum_{n=1}^{L}C_n(N_e(v-1)+m)^*\Big]\end{aligned} \tag{33}$$

Thus, the reception DC offset component (component including $\alpha_{Rx}$) shown in the expression (30) is canceled. In the expression (30), when the Doppler frequency fluctuation $f_{dTx}$ is zero, the transmission DC offset component (component including $\alpha_{Tx}$) is canceled in the same manner as the reception DC offset component.

On the other hand, when the Doppler frequency fluctuation $f_{dTx}$ is not zero or when the reflection wave signal includes the Doppler frequency fluctuation, the output ACC (k, v) of the coherent integrator 207 includes the transmission DC offset component shown in the following expression (33) irrespective of k.

$$FT_CI(k, f_s) = \sum_{q=0}^{N_d-1} ACC(k, q+1)\exp[-j\psi(f_s)q] = \sum_{q=0}^{N_d-1} ACC(k, q+1)\exp[-j2\pi f_s T_r N_e q\Delta\phi] \tag{34}$$

The phase rotation controller 103 performs control to randomly change the phase change pattern $PC(N_e(v-1)+m)$ of the phase rotation to 1 or −1 for every predetermined number $N_e$ of times (or every integration period of the coherent integrator 207). Thus, in the output of the Doppler analyzer 208, a residual transmission DC offset component included in the output ACC (k, v) of the coherent integrator shown in the expression (33) is whitened in the Doppler frequency region. Thus, increase of noise level (floor level) of a specific Doppler frequency component may be inhibited, and deterioration of radar detection function may be suppressed.

The Doppler analyzer 208 performs a Doppler frequency analysis for the output signal from the coherent integrator 207. Specifically, the Doppler analyzer 208 performs the Doppler frequency analysis on a basis of the $N_d$ outputs ACC(k, 1) to ACC(k, $N_d$) of the coherent integrator 207 as a unit, which are obtained at each discrete time k, with the discrete time k in synchronization. As described above, the residual transmission DC offset component included in each of $N_d$ outputs ACC(k, 1) to ACC(k, $N_d$) of the coherent integrator 207 is whitened in the Doppler frequency region. Thus, Doppler frequency analysis by the Doppler analyzer 208 may suppress increase in the noise level (floor level) of a specific frequency component caused by the transmission DC offset component.

More specifically, as shown in the following expression (34), the Doppler analyzer 208 performs coherent integration after correcting phase variations $\Psi(f_s)=2\pi f_s(T_r\times N_e)\Delta\Psi$ in accordance with $2N_f$ different Doppler frequencies $f_s\Delta\Psi$.

$$R(k) = k\frac{T_w C_0}{2L} \tag{35}$$

Herein, FT_Cl(k, $f_s$) indicates a result of coherent integration of Doppler frequencies $f_s\Delta\Psi$ at the discrete time k by the Doppler analyzer 208. Herein, $f_s=-N_f+1, \ldots, 0, \ldots, N_f$, and $k=1, \ldots, (N_r+N_u)N_s/N_o$. $\Delta\Psi$ is a unit of phase rotation.

The signal processor 203 thereby obtains the results of coherent integration corresponding to the $2N_f$ Doppler frequency components at each discrete time k, FT_Cl(k, $-N_f+1$), . . . , FT_Cl(k, $N_f-1$), for each period corresponding to plural numbers $N_e\times N_d$ of the radar transmission cycles $T_r$ ($T_r\times N_e\times N_d=T_r\times Q$). Herein, j is the imaginary unit.

When $\Delta\Psi=1/N_d$, the processing of the Doppler analyzer 208 is equivalent to discrete Fourier transform (DFT) for the outputs of the coherent integrator 207 with a sampling interval of $T_r\times N_e$, or a sampling frequency of $1/(T_r\times N_e)$.

Moreover, when $N_f$ is set to a power of 2, fast Fourier transform (FFT) can be applied in the Doppler analyzer 208, thus reducing the processing amount. When $N_f>N_d$, FFT can be applied in a similar manner by performing zero padding in the region of $q>N_d$ as $ACC(k, N_d(w-1)+q+1)=0$, reducing the processing amount.

Based on the outputs FT_Cl(k, $f_s$) of the Doppler analyzer 208, the radar apparatus 10 estimates the range/Doppler frequency (relative velocity) of the radar measurement target.

The square $|FT_Cl(k, f_s)|^2$ of the absolute value of the output FT_Cl(k, $f_s$) from the Doppler analyzer 208 corresponds to the reception level of reflection waves from the target at each Doppler frequency $f_s$ and each discrete time k. The radar apparatus 10 estimates the range R(k) to the target based on the discrete time k and Doppler frequency f at which the power increases from the noise level to a predetermined peak level or higher and estimates the relative velocity $v_d(f_s)$ based on the Doppler frequency in the following manner. Herein, $f_s=-N_f+1, \ldots, 0, \ldots, N_f$, and $k=1, \ldots, (N_r+N_u)N_s/N_o$.

To translate the time information k to the range information R(k), the following expression (35) is used. Herein, Tw is the code transmission slot; L is the pulse code length; and $C_0$ is the velocity of light.

$$v_d(f_s) = \frac{\lambda}{2} f_s \Delta\psi \tag{36}$$

To translate the Doppler frequency information $f_s$ to the relative velocity component $V_d(f_s)$, the following expression (36) is used. Herein, λ is the wavelength of the carrier frequency of the RF radar transmission signal outputted from the transmission radio unit 106.

$$h(k, fs, w) = \begin{bmatrix} FT_CI_1^{(1)}(k, fs, w) \\ FT_CI_2^{(1)}(k, fs, w) \\ \vdots \\ FT_CI_{Na}^{(1)}(k, fs, w) \\ FT_CI_1^{(2)}(k, fs, w) \\ FT_CI_2^{(2)}(k, fs, w) \\ \vdots \\ FT_CI_{Na}^{(2)}(k, fs, w) \\ \vdots \\ FT_CI_1^{(Nt)}(k, fs, w) \\ FT_CI_2^{(Nt)}(k, fs, w) \\ \vdots \\ FT_CI_{Na}^{(Nt)}(k, fs, w) \end{bmatrix} = \begin{bmatrix} h^1(k, fs, w) \\ h^2(k, fs, w) \\ \vdots \\ h^{Nt}(k, fs, w) \end{bmatrix} \tag{37}$$

$$h^{N_D}(k, fs, w) = \begin{bmatrix} FT_CI_1^{(N_D)}(k, fs, w) \\ FT_CI_2^{(N_D)}(k, fs, w) \\ \vdots \\ FT_CI_{Na}^{(N_D)}(k, fs, w) \end{bmatrix} \tag{38}$$

The effects of the operations of the phase rotation controller 103, the transmission phase rotator 104, and the reception phase rotator 206 described above are confirmed using computer simulations. The results thereof are shown below.

Figure 4A:
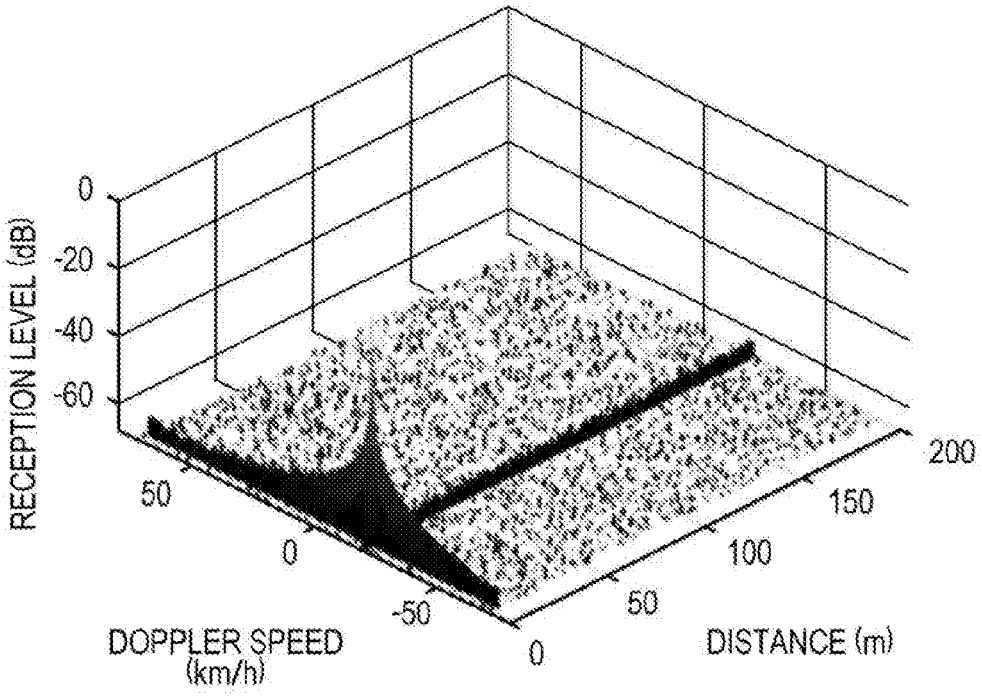
FIG. 4A is a diagram illustrating an example of a computer simulation result of an output of a Doppler analyzer when phase inversion is not performed.
Figure 4B:
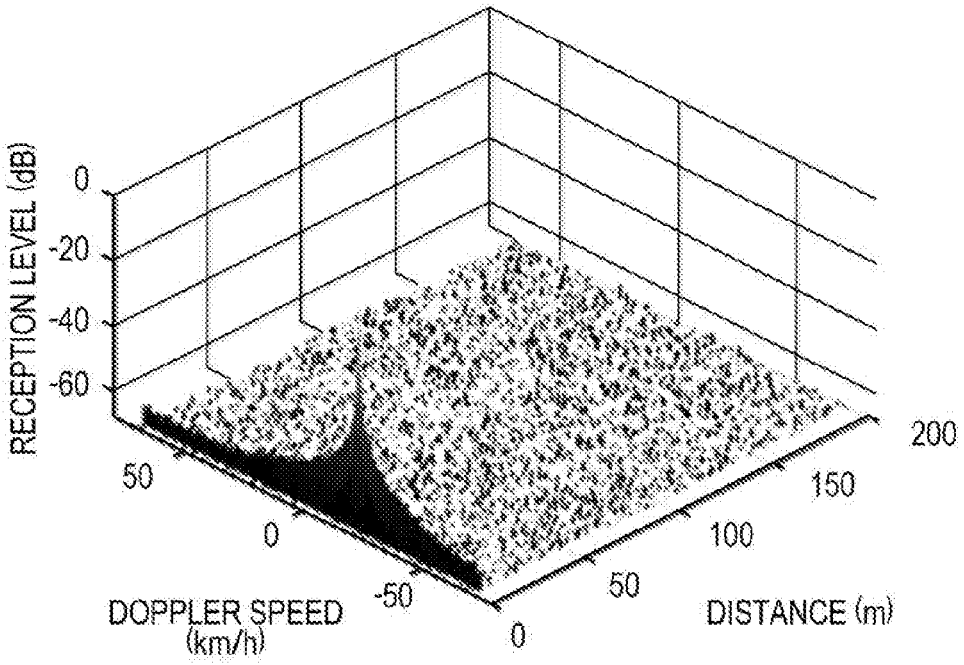
FIG. 4B is a diagram illustrating an example of a computer simulation result of an output of a Doppler analyzer according to the Embodiment 1 of the disclosure.

FIGS. 4A and 4B illustrate outputs (reception levels) from the Doppler analyzer 208 under the conditions where one measurement target moves away from the radar apparatus 10 at a distance of 5 m and a velocity of 20 km/h.

In FIGS. 4A and 4B, the transmission DC offset component (the carrier leak component) exists in the transmission radio unit 106 as the condition FIGS. 4A and 4B illustrate the results of computer simulations performed under the following conditions: the radar transmission codes are Spano codes (code length L=64); the number $N_e$ of additions by the coherent integrator 207 is 32; and the number $N_d$ of samples in the Doppler analyzer 208 is 512.

FIG. 4A illustrates a result when the phase inversion (PC(m)) is not randomly changed over as in a conventional radar apparatus, but unlike operations of the radar apparatus 10 according to the present embodiment. On the other hand, FIG. 4B illustrates a result of random change-over of the phase inversion by the phase change pattern PC(m) in the phase rotation controller 103 as described above.

In both FIGS. 4A and 4B, a sharp peak appears at coordinates of a distance of 5 meters and a speed per hour of 20 km/h. This indicates that a desired measurement target is detected.

However, in FIG. 4A, peaks of the weak reception level appear evenly across entire distance range (0 to 200 meters) in the Doppler frequency component of the speed per hour of 20 km/h in addition to the peak of the desired measurement target at coordinates of the distance of 5 meters and the speed per hour of 20 km/h. These peaks of the weak reception level are frequency components that do not exist intrinsically, and cause error detection.

Meanwhile, in FIG. 4B illustrating a result based on operations according to the embodiment, peaks of the weak reception level such as detected in FIG. 4A do not appear evenly across entire distance range in a specific Doppler frequency component, in addition to the peak of a desired measurement target at the distance of 5 meters and the speed per hour of 20 km/h. In other words, according to the embodiment, no deterioration of radar performance causing an error detection may be verified even under the condition that the transmission DC offset (carrier leak) exists in the transmission radio unit 106.

As described above, the radar apparatus 10 includes a phase rotation controller 103 which changes the phase change pattern PC(m) of the phase rotation amount every period ($N_e \times T_r$) corresponding to a plurality ($N_e$) of radar transmission cycles ($T_r$), the phase change pattern PC(m) being to be applied to a radar transmission signal (transmission code) within the period ($N_e \times T_r$), a transmission phase rotator 104 which assigns a phase rotation (first phase rotation) to the radar transmission signal in accordance with the phase change pattern, and a reception phase rotator 206 configured to assign a phase rotation in the direction opposite to the first phase rotation to a reflection wave signal (in FIG. 1, correlation operation value ACC(k, m)) in accordance with the phase change pattern.

More specifically, with operations of the phase rotation controller 103, the transmission phase rotator 104, and the reception phase rotator 206, the radar apparatus 10 randomly switches whether not to set each unit of transmission codes to a code added with a phase inversion (code added with a phase change of $\pi$), where one unit of transmission codes are those that cancel the reception DC offset within the period ($N_e \times T_r$).

Thus, in the coherent integrator 207 of the radar apparatus 10, the output subjected to the coherent integration processing does not have a fixed phase fluctuation, and thereby the residual transmission DC offset component is whitened in the Doppler frequency region. Thus, increase of noise level (floor level) of a specific Doppler frequency component at the output of the Doppler analyzer 208 may be inhibited, and deterioration of radar detection function may be suppressed.

Thus, according to the embodiment, deterioration of radar detection performance caused by a circuit error may be suppressed.

According to the embodiment, the radar apparatus 10 may inhibit deterioration of radar detection performance caused by a transmission DC offset without a circuit configuration for correcting the transmission DC offset (carrier leak) with high accuracy. Thus, configuration of the radar apparatus 10 may be simplified.

Figure 5:
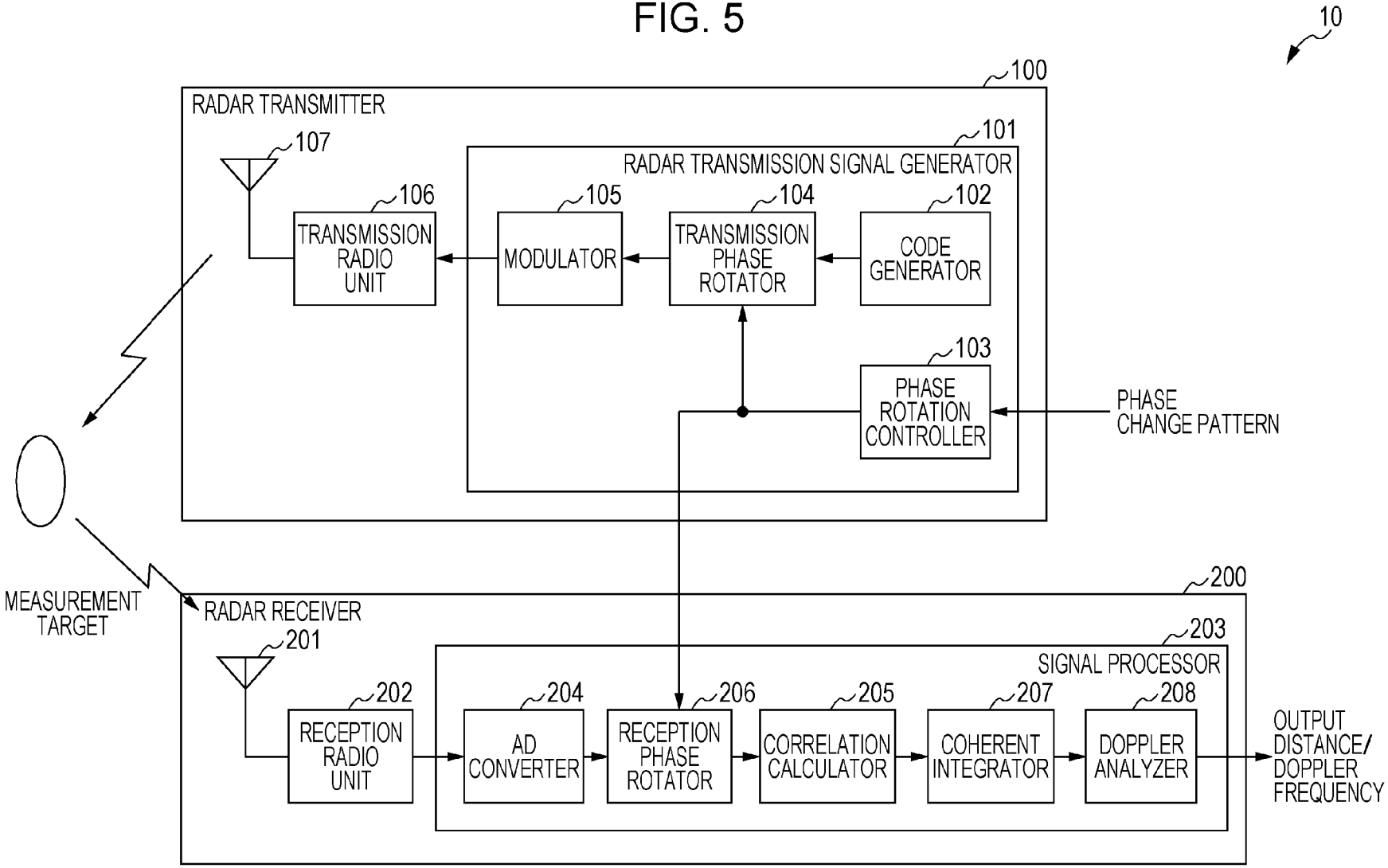
FIG. 5 is a diagram illustrating another configuration example of the radar apparatus according to the Embodiment 1 of the disclosure.

In FIG. 1, the reception phase rotator 206 of the radar apparatus 10 is provided after the correlation calculator 205. As illustrated in FIG. 5, the reception phase rotator 206 may be provided before the correlation calculator 205. This configuration provides the same effects as that of Embodiment 1.

Embodiment 2

Since a radar apparatus according to the Embodiment 2 has a basic configuration common to the radar apparatus 10 according to the Embodiment 1, description is given with reference to FIG. 1.

Figure 6:
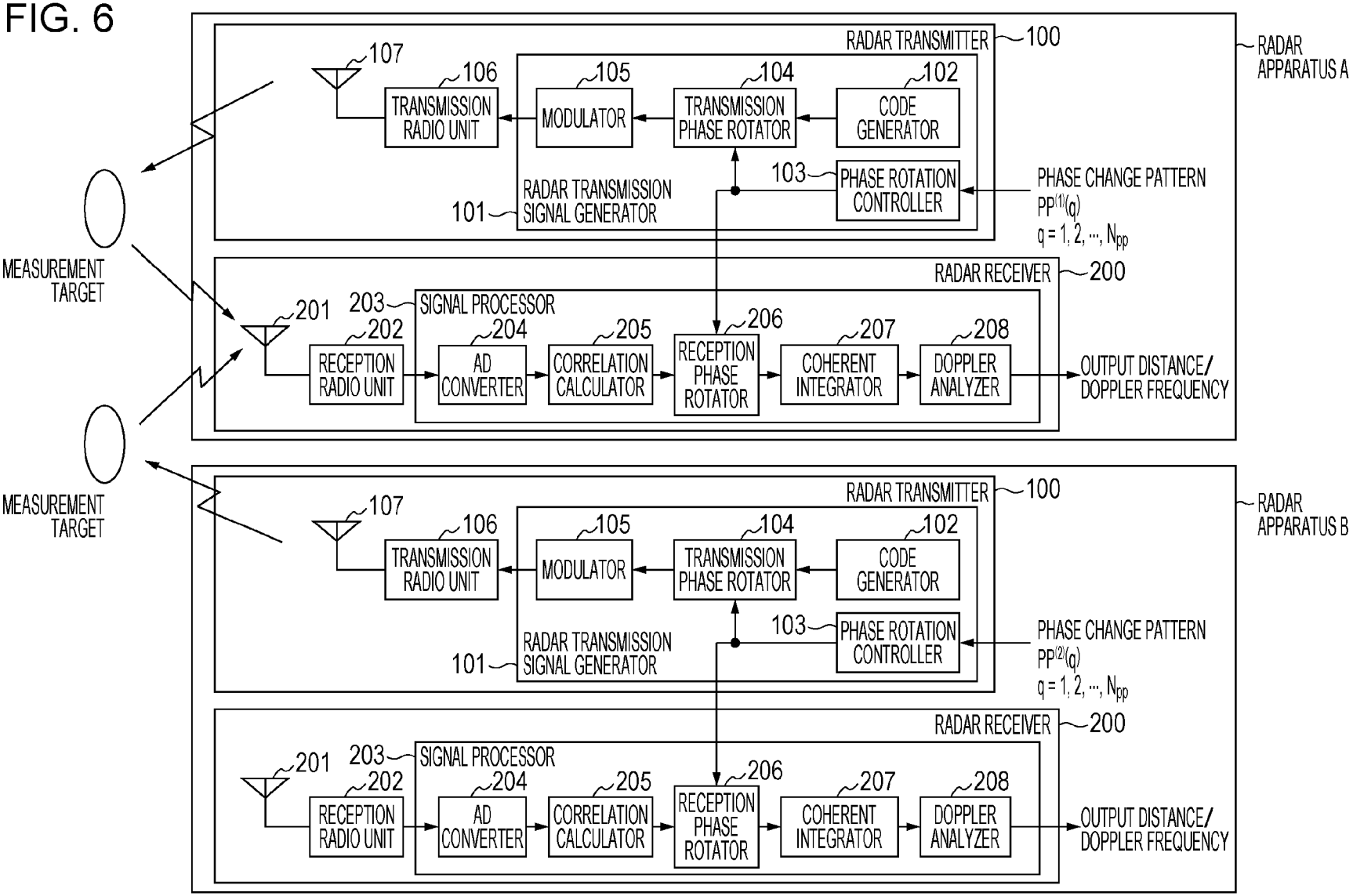
FIG. 6 is a block diagram illustrating a configuration example of a radar apparatus according to Embodiment 2 of the disclosure.

As illustrated in FIG. 6, a configuration including two or more radar apparatuses (FIG. 1) according to the Embodiment 1 is described in the Embodiment 2. Hereinafter, a configuration including two radar apparatuses A and B illustrated in FIG. 6 is described as an example.

In the Embodiment 2, a plurality of radar apparatuses 10 differentiate, from each other, the phase change pattern controlled by the phase rotation controller 104 of each radar apparatus 10. For example, a phase change pattern $PP^{(1)}(q)$ (however, q=1, 2, . . . , $N_{pp}$) is set to the radar apparatus A illustrated in FIG. 6, and a phase change pattern $PP^{(2)}(q)$ (however, q=1, 2, . . . , $N_{pp}$) is set to the radar apparatus B.

As an example, the phase rotation controller 103 of each radar apparatus 10 may set a different phase change pattern by shifting the transmission timing of the same M-sequence code. For example, the phase change pattern $PP^{(1)}(q)$ of the radar apparatus A is a pattern using a M-sequence code of a code length of 511 (however, q=1, . . . , 511). In this case, the phase change pattern $PP^{(2)}(q)$ of the radar apparatus B may be a pattern with the transmission timing shifted by $N_{shift}$ of the M-sequence code used in the radar apparatus A. More specifically, $PP^{(2)}(q)=PP(1)(q+N_{shift})$.

For example, FIG. 6 shows an example where a radar receiver 200 of the radar apparatus A receives a reception signal (desired signal) that is a reflected wave of the radar transmission signal transmitted by the radar apparatus A, and a reflected wave (interference signal) of the radar transmission signal transmitted by the radar apparatus B.

In this case, transmission DC offset components residing in the reception signals from radar apparatuses A and B are whitened in the Doppler frequency region in the same manner as in the Embodiment 1 by differentiating phase change patterns between radar apparatuses A and B, as described above. Thus, increase of the noise level (floor level) of a specific Doppler frequency component may be inhibited, and deterioration of radar detection function of the radar apparatus A may be suppressed. In other words, this provides an effect of reducing mutual interference between a plurality of radar apparatuses 10 using the same frequency band or some of frequency bands overlapping each other.

Figure 7:
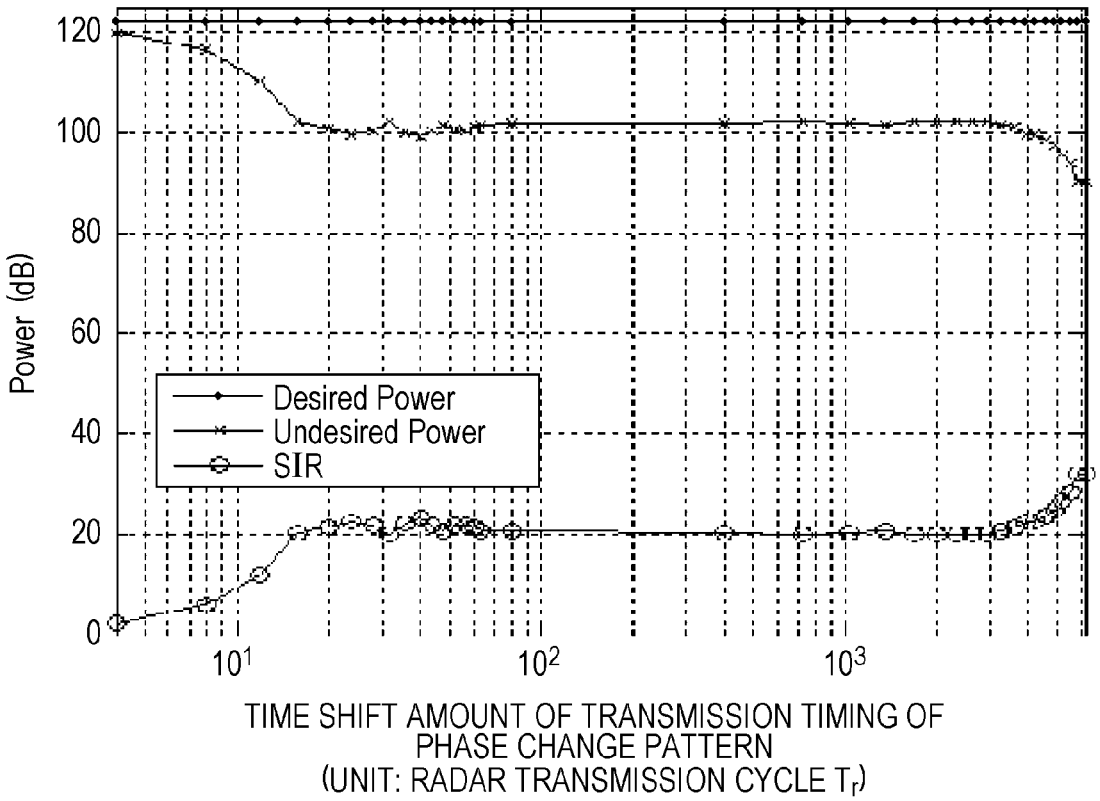
FIG. 7 is a diagram illustrating an example of a computer simulation result of an output of a Doppler analyzer according to the Embodiment 2 of the disclosure.

FIG. 7 illustrates a result of evaluations by a computer simulation on the mutual interference amount when radar apparatuses A and B transmit radar transmission signals using phase change patterns different from each other.

In FIG. 7, radar apparatuses A and B use complementary codes as transmission codes, and phase shifts in the phase rotation controller 103 are $N_e$=16 and $N_s$=2. $N_d$=512 is used in the Doppler analyzer 208 in the radar apparatuses A and B.

In FIG. 7, the horizontal axis shows the time shift amount in the transmission timing of the phase change pattern by a unit of the radar transmission cycle ($T_r$), and the vertical axis shows reception power (desired power) of the radar apparatus A, reception power (undesired power (plotted with x)) of the radar apparatus B, and the signal to interference power ratio (SIR (plotted with white circle)) of the radar apparatus A.

From the simulation result shown in FIG. 7, improvement of the SIR of the radar apparatus A by about 20 dB may be verified when there is a time shift of the transmission timing by more than 16 (=$N_e$) radar transmission cycles in the transmission timing of the M-sequence code as a phase change pattern of the radar apparatuses A and B.

The phase rotation controller 103 sequentially reads elements PP(q) of the phase change pattern and repeatedly outputs a value of the same element across $N_e$ radar transmission cycles (=$N_e \times T_r$). This indicates that when $N_{shift} \geq 1$, there are time shifts of the transmission timing more than 16 (=$N_e$) radar transmission cycles between different phase change patterns, and thereby interference suppression effect may be enhanced. Improvement amount of the SIR depends on the code length $N_{pp}$ of the code used in the phase change pattern, and the pattern $N_d$ (for example, $N_d$=512) used by the Doppler analyzer 208. For this reason, as longer $N_p$ and $N_d$ are used in an allowable measurement time, the SIR is improved more.

As described above, in the Embodiment 2, the phase change pattern is different between two or more radar apparatuses 10. For example, the transmission timing of the same M-sequence code used in the phase change patterns of the radar apparatuses 10 is shifted. This reduces mutual interference between the plurality of radar apparatuses 10.

In the above case, transmission timings of the plurality of radar apparatuses 10 may match each other incidentally. Thus, there is a possibility stochastically that interference may not be suppressed. Meanwhile, mutual interference may be reduced stochastically by a method descried below.

Specifically, in a plurality of radar apparatuses 10, a preferred pair of low mutual correlation out of M-sequence codes of a code length of $N_{pp}$ are used in each phase change pattern.

Alternatively, it is known that $N_{pp}$ pieces of different gold codes may be generated from a preferred pair of low mutual correlation out of M-sequence codes of a code length of $N_{pp}$. Thus, in a plurality of radar apparatuses 10, gold codes generated from a preferred pair of low mutual correlation may be used in each phase change pattern.

Alternatively, mutual interference may be reduced stochastically by randomly varying each phase change pattern every radar measurement or every predetermined number of radar measurements in a plurality of radar apparatuses 10.

Embodiment 3

In the Embodiment 2, a method of reducing mutual interference between a plurality of radar apparatuses 10 by differentiating the phase change pattern between the plurality of radar apparatuses 10 is described. Meanwhile, in the Embodiment 3, a configuration of a multiple input multiple output (MIMO) radar using a plurality of transmission and reception antennas in place of a plurality of radar apparatuses 10 is described.

In other words, in the Embodiment 3, the phase change pattern is different between a plurality of transmission antennas (or between streams of the MIMO).

Figure 8:
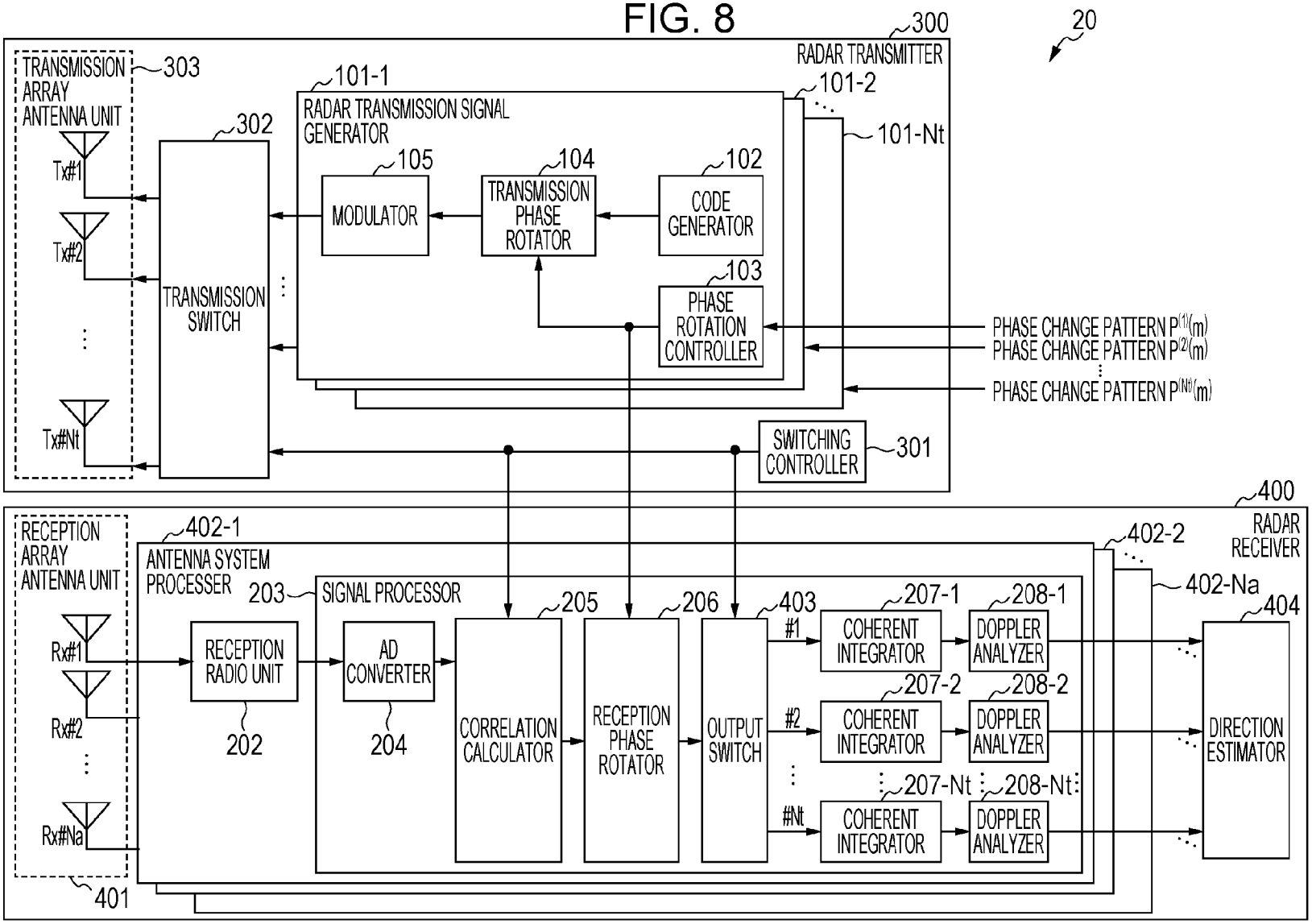
FIG. 8 is a block diagram illustrating a configuration example of a radar apparatus according to Embodiment 3 of the disclosure.

FIG. 8 is a block diagram illustrating a configuration example of a radar apparatus 20 according to Embodiment 3. In FIG. 8, the same components as those of Embodiment 1 (FIG. 1) are given the same reference numerals, and the description thereof is omitted.

The radar apparatus 20 illustrated in FIG. 8 has a time-division MIMO radar configuration which transmits time-division multiplexed different radar transmission signals switching to one of the plural transmission antennas in a time-division manner and separates each radar transmission signal for reception processing. The configuration of the radar apparatus is not limited thereto. The radar apparatus 20 may be configured to transmit different frequency-division multiplexed or code-division multiplexed transmission signals through plural transmission antennas and separates each transmission signal for reception processing.

[Configuration of Radar Transmitter 300]

A radar transmitter 300 of the radar apparatus 20 includes the radar transmission signal generators 101-1 to 101-Nt, a switching controller 301, a transmission switch 302, and a transmitting array antenna unit 303.

The transmitting array antenna unit 303 includes Nt transmitting antennas (Tx#1 to Tx#Nt).

Radar transmission signal generators 101-1 to 101-Nt are provided in Nt transmission antennas (Tx#1 to Tx#Nt) so as to correspond respectively. Each radar transmission signal generator 101 operates in the same manner as in the Embodiment 1 (FIG. 1). However, the phase change pattern set in each radar transmission signal generator 101 is different from each other.

For example, the phase change pattern in each of Nt radar transmission signal generators 101 is set by shifting the transmission timing of the same M-sequence code by more than one code elements.

Specifically, the phase change pattern in the radar transmission signal generator 101-1 is $PP^{(1)}(q)$ (however, q=1, $N_{pp}$). In this case, the phase change pattern in the radar transmission signal generator 101-2 may be $PP^{(2)}(q+N_{shift})$, and the phase change pattern in the radar transmission signal generator 101-3 may be $PP^{(3)}(q+2N_{shift})$. In the same manner, the phase change pattern in a radar transmission signal generator 101-Nt may be $PP^{(Nt)}(q+(Nt-1)\ N_{shift})$. However, $N_{shift} \geq 1$.

A preferred pair of low mutual correlation out of M-sequence codes of a code length of $N_{pp}$ may be used as a phase change pattern in each of the Nt radar transmission signal generators 101. Alternatively, it is known that $N_{pp}$ different gold codes may be generated from a preferred pair of low mutual correlation out of M-sequence codes of a code length of $N_{pp}$. Thus, gold codes generated from a preferred pair of low mutual correlation may be used as a phase change pattern in each of Nt radar transmission signal generators 101. Alternatively, mutual interference may be reduced stochastically by randomly varying the phase change pattern in each of Nt units of radar transmission signal generators 101 every radar measurement (or for every predetermined number of measurements).

The switching controller 301 outputs a control signal (hereinafter, referred to as a switching control signal) indicating a time to change the transmitting antennas (Tx#1 to Tx#Nt) of the transmitting array antenna unit 303 (or instructing selection of the output of the radar transmission signal) to the transmission switch 302 and a radar receiver 400 (the correlation calculator 205 and an output switch 403).

The transmission switch 302 selects one of the Nt transmitting antennas of the transmitting array antenna unit 303 based on the switching control signal from the switching controller 301 to input the output signal from the radar transmission signal generator 101 corresponding to the selected transmitting antenna among the output signal from the Nt radar transmission signal generator 101, to the selected transmitting antenna. The transmission switch 302 applies frequency conversion to the output signal (baseband radar transmission signal) from the selected radar transmission signal generator 101, into a predetermine radio frequency and outputs the radio frequency signal to the selected (connected) transmitting antenna.

The transmitting array antenna unit 303 radiates the radar transmission signal outputted from the transmission switch 302 from the transmitting antenna selected by (connected to) the transmission switch 302 into space.

Hereinafter, a description is given of an operation of the switching controller 301 to control the transmission switch 302. The operation of the switching controller 301 to control the radar receiver 400 is described later in the description of the operation of the radar receiver 400.

The switching controller 301 outputs to the transmission switch 302, the switching control signal to sequentially switch to one of the transmitting antennas and radar transmission signal generator 101 every $N_e$ radar transmission cycles.

For example, the switching controller 301 causes the transmission switch 302 to input the output signal from the radar transmission signal generator 101-1 and the transmitting antenna (Tx#1) of the transmitting array antenna unit 303 to output the converted high-frequency signal in the first $N_e$ radar transmission cycles ($N_e \times T_r$).

The switching controller 301 causes the transmission switch 302 to input the output signal from the radar transmission signal generator 101-2 and the transmitting antenna (Tx#2) of the transmitting array antenna unit 303 to output the converted high-frequency signal in the next $N_e$ radar transmission cycles ($N_e \times T_r$).

The switching controller 301 repeats the same operation and causes the transmission switch 302 to input the output signal from the radar transmission signal generator 101-Nt and the transmitting antenna (Tx#Nt) of the transmitting array antenna unit 303 to output the converted high-frequency signal.

The switching controller 301 again causes the transmission switch 302 to input the output signal from the radar transmission signal generator 101-1 and the transmitting antenna (Tx#1) of the transmitting array antenna unit 303 to output the converted high-frequency signal in the next $N_e$ radar transmission cycles ($N_e \times T_r$).

The switching controller 301 repeats the aforementioned operation for a predetermined number of times ($N_d \times N_t$).

In the above operations, the radar transmitter 300 operates so as to sequentially read GP(m) (for example, see the expression (19) or (20)) described in the Embodiment 1 as a signal generated by each radar transmission signal generator 101. Here, m=1, . . . , $N_e \times N_d$.

[Configuration of Radar Receiver 400]

The radar receiver 400 of the radar apparatus 20 includes a receiving array antenna unit 401, an antenna system processor 402, and a direction estimator 404.

The receiving array antenna unit 401 includes Na receiving antennas (Rx#1 to Rx#Na). The Na receiving antennas individually receive signals (reflection wave signals) which are reflections of the radar transmission signal transmitted from the radar transmitter 300 on reflective objects including a radar measurement target. The signals received by the Na receiving antennas are inputted to the respective antenna system processors 402 corresponding to the receiving antennas (Rx#1 to Rx#Na) as reception signals.

Each of the antenna system processors 402 includes the reception radio unit 202 and the signal processor 203.

The reception radio unit 202 of the z-th antenna system processor 402-z amplifies the reception signal from the z-th receiving antenna (Rx#z) to a predetermined level and performs frequency-conversion for the high-frequency reception signal into a baseband reception signal. The z-th reception radio unit 202 then converts the baseband reception signal to the baseband reception signal including I and Q signals. Herein, z=1, . . . , Na.

The signal processor 203 of the z-th antenna system processor 402-z includes the AD converter 204, the correlation calculator 205, the reception phase rotator 206, an output switch 403, the coherent integrators 207, and the Doppler analyzers 208. The signal processor 203 includes Nt coherent integrators 207 and Nt Doppler analyzers 208 corresponding to the transmitting antennas (Tx#1 to Tx#Nt).

Hereinafter, a description is given of each component of the signal processor 203 of the z-th antenna system processor 402-z, mainly operations different from those of Embodiment 1.

The correlation calculator 205 calculates correlation between the complex baseband signals $X(N_v(m-1)+k)$ outputted from the AD converter 204 (see the expression (23), for example) and the transmission codes generated by the radar transmission signal generator 101 every $N_e$ radar transmission cycles ($N_e \times T_r$) selected by the switching controller 301.

The reception phase rotator 206 assigns, to a signal (correlation operation value) outputted from the correlation calculator 205, a phase rotation in the direction opposite to (in a canceling direction) a phase rotation assigned by the transmission phase rotator 103 of the radar transmission signal generator 101 selected by the switching controller 301 every $N_e$ radar transmission cycles ($N_e \times T_r$).

The output switch 403 switches to one of the coherent integrators 207-1 to 207-Nt corresponding to the transmission antenna number (#1 to #Nt) selected every $N_e$ radar transmission cycles ($N_e \times T_r$) by the switching controller 301.

When the transmitting antenna (Tx#1) is selected by the switching controller 301, for example, the output switch 403 outputs the signal from the reception phase rotator 206 to the coherent integrator 207-1 corresponding to the transmitting antenna (Tx#1).

When the transmitting antenna (Tx#2) is selected by the switching controller 301, the output switch 403 outputs the signal from the reception phase rotator 206 to the coherent integrator 207-2 corresponding to the transmitting antenna (Tx#2).

The output switch 403 repeats the same operation and, when the transmitting antenna (Tx#Nt) is selected by the switching controller 301, outputs the signal from the reception phase rotator 206 to the coherent integrator 207-Nt corresponding to the transmitting antenna (Tx#Nt).

For unit period defined by a plurality ($N_e$) of radar transmission cycles ($=N_e \times T_r$), the $N_D$-th coherent integrator 207-$N_D$ performs coherent integration for the outputs of the reception phase rotator 206 selected by the switching controller 301 every $N_e$ radar transmission cycle ($N_e \times T_r$). Herein, $N_D$=1, . . . , Nt.

Each of the Doppler analyzers 208 performs a Doppler frequency analysis for the output signals from the corresponding coherent integrator 207. The Doppler analyzer 208 performs a Doppler frequency analysis using the $N_d$ outputs from the coherent integrator 207 obtained at each discrete time k, with of the discrete time k in synchronization.

As described above, in the radar apparatus 20, transmission antennas are changed over by the switching controller 301 every predetermined number $N_e$ of times (or, an integration period of the coherent integrator 207), and a phase change pattern PC(m) different between transmission antennas is set. Thus, in the output of the Doppler analyzer 208 corresponding to respective transmission antennas, a residual transmission DC offset component included in the output ACC (k, v) (see the expression (31)) of the coherent integrator 207 to the radar transmission signal transmitted from respective transmission antennas is whitened in the Doppler frequency region in the same manner as the Embodiment 1. Thus, increase of the noise level (floor level) of a specific Doppler frequency component may be inhibited, and deterioration of radar detection function may be suppressed. Further, since phase change patterns different between transmission antennas are set, mutual interference between radar transmission signals transmitted by respective transmission antennas may be reduced.

In the following description, w-th outputs $FT_Cl_{(z)}^{(1)}(k, fs, w), \ldots, FT_Cl_{(z)}^{(Na)}(k, fs, w)$ from the Doppler analyzers 208 at each discrete time k, which are obtained by the same processing in the antenna system processors 402-1 to 402-Na, are collectively represented as a virtual reception array correlation vector h(k, fs, w) shown in the following expressions (37) and (38). The virtual reception array correlation vector h(k, fs, w) includes Nt×Na (a product of the number Nt of transmitting antennas and the number Na of receiving antennas) elements. The virtual reception array correlation vector h(k, $f_s$, w) is used to describe the process to perform direction estimation based on phase differences in reflection wave signals from the target between the receiving antennas. Herein, z=1, . . . , Nt, and $N_D$=1, . . . , Na. $f_s$=$-N_f$+1, . . . , 0, . . . , $N_f$.

$$h_{after\ cal}(k, fs, w) = CAh(k, fs, w) = \begin{bmatrix} h_1(k, fs, w) \\ h_2(k, fs, w) \\ \vdots \\ h_{Na\times Nr}(k, fs, w) \end{bmatrix} \tag{39}$$

$$CA = \begin{bmatrix} h_cal_{[1]} & 0 & \ldots & 0 \\ 0 & h_cal_{[2]} & \ddots & \ldots \\ \vdots & \ddots & \ddots & 0 \\ 0 & \ldots & 0 & h_cal_{[Nt\times Na]} \end{bmatrix}$$

Hereinabove, the processing in each component of the signal processor 203 of the antenna system processor 402-z is described.

The direction estimator 404 multiplies the w-th virtual array correlation vector h(k, fs, w) at each discrete time k from the Doppler analyzers 208 of the antenna system processors 402-1 to 402-Na, by array correction values h_cal[b] to correct phase and amplitude deviations between the transmitting antennas of the transmitting array antenna unit 503 and between the receiving antennas of the receiving array antenna unit 401, to calculate a virtual receiving array correlation vector $h_{after_cal}$ (k, fs, w) with the inter-antenna deviations corrected. The virtual receiving array correlation vector $h_{after_cal}$ (k, fs, w) is represented by the following expression (39). b=1, . . . , (Nt×Na).

$$P_H(\theta_u, k, fs, w) = \left|a_H(\theta_u)^H h_{VAH}(k, fs, w)\right|^2 \tag{40}$$

$$a_H(\theta_u) = \begin{bmatrix} 1 \\ \exp\{-j2\pi d_H \sin\theta_u / \lambda\} \\ \vdots \\ \exp\{-j2\pi(N_{VAH}-1)d_H \sin\theta_u / \lambda\} \end{bmatrix} \tag{41}$$

The virtual receiving array correlation vector $h_{after_cal}$ (k, fs, w) with the inter-antenna deviations corrected is a column vector composed of Na×$N_r$ elements. Hereinafter, each element of the virtual receiving array correlation vector $h_{after_cal}$ (k, fs, w) is represented as $h_1$(k, fs, w), . . . , $h_{Na\times Nr}$(k, fs, w) to be used in description of the direction estimation process.

The direction estimator 404 uses the virtual receiving array correlation vector $h_{after_cal}$ (k, fs, w) to perform the direction estimation process based on the phase difference in reflection wave signals between the receiving antennas.

The direction estimator 404 calculates a spatial profile by varying the azimuth direction θ within a predetermined angular range in a direction estimation evaluation function value $P_H$(θ, k, fs, w). The direction estimator 404 extracts a predetermined number of the largest local peaks in the calculated spatial profile and determines the azimuth directions of the extracted local peaks as the direction-of-arrival estimation values.

The evaluation function value $P_H$(θ, k, fs, w) depends on the DOA estimation algorithm. For example, the evaluation function value $P_H$(θ, k, fs, w) may be based on the estimation method using an array antenna disclosed in "Direction-of-arrival estimation using signal subspace modeling Cadzow, J. A.; Aerospace and Electronic Systems, IEEE Transactions on Volume: 28, Issue: 1 Publication Year: 1992, Page(s): 64-79)".

For example, the beam former algorithm is represented by the following expressions (40) and (41). Other algorithms, such as Capon and MUSIC, are also applicable.

$$\begin{cases} R_{aa}(\tau) + R_{bb}(\tau) \neq 0, & \text{when } \tau = 0 \\ R_{aa}(\tau) + R_{bb}(\tau) = 0, & \text{when } \tau \neq 0 \end{cases} \tag{3}$$

Herein, the superscript H is the Hermitian transpose operator. $a_H(\theta_u)$ indicates the direction vector of the virtual receiving array with respect to the arriving waves in the azimuth direction $\theta_u$. $\theta_u$ is varied at a predetermined azimuth interval $\beta_1$ within the range of azimuth for the direction-of-arrival estimation. For example, $\theta_u$ is set as follows.

$$\theta_u = \theta min + u\beta_1,\ u=0, \ldots, NU$$

$$NU = floor[(\theta max - \theta min)/\beta_1] + 1$$

Herein, the floor(x) is a function to return the greatest integer not exceeding a real value x.

Hereinabove, the configuration of the radar receiver 400 is described.

As above, since the variable pattern to the radar transmission signal transmitted by respective transmission antennas is differentiated by the radar apparatus 20 that is the MIMO radar, mutual interference between radar transmission signals transmitted by changing over a plurality of transmission antennas may be reduced.

In the Embodiment 3, time intervals of changing over a plurality of transmission antennas may be narrowed to an extent of the reduction of mutual interference between radar transmission signals transmitted by changing over a plurality of transmission antennas, and thereby detection time may be reduced.

Hereinabove, the embodiments according to an aspect of the disclosure are described.

The operations of the aforementioned embodiments and variations thereof may be combined properly.

Other Embodiments (1) In the above embodiments, radar apparatuses 10 and 20 may include a circuit configuration that corrects the transmission DC offset in a simplified manner. Thus, when concurrently using a configuration of controlling the phase change pattern described above and a configuration of correcting the transmission DC offset, radar apparatuses 10 and 20 may further suppress increase of the noise level caused by the transmission DC offset.

(2) In the above embodiments, a coding pulse radar is used. However, the disclosure may be also applied to a radar scheme using a frequency-modulated pulse wave, such as a chirp and a pulse radar.

(3) In the radar apparatuses 10 and 20 illustrated in FIGS. 1, 5, 6, and 8, the radar transmitters 100 and 300 may be individually provided physically apart from the radar receivers 200 and 400 respectively.

(4) The radar apparatuses 10 and 20 may include a central processing unit (CPU), a storage medium such as a read only storage (ROM) storing control programs, and working memories such as a random access storage, which are not illustrated, for example. In this case, the function of each component is implemented by execution of a control program by the CPU.

Hereinabove, the various types of embodiments are described with reference to the drawings. However, it is obvious that the disclosure is not limited to the aforementioned examples. It is obvious that those skilled in the art can arrive at various modifications and changes within the scope of the matters described in the claims, and it is certainly understood that such changes and modifications are within the technical scope of the disclosure. Moreover, the constituent components of the aforementioned embodiments may be arbitrarily combined without departing from the scope of the disclosure.

In the above description of each embodiment, the disclosure is implemented by hardware by way of example. The disclosure can be implemented by software in cooperation with hardware.

Each functional block used in the description of the above embodiments is typically implemented as an LSI, which is an integrated circuit. The integrated circuit controls each functional block used in the description of the above embodiments and may include input and output terminals. These functional blocks may be implemented as individual chips, or all or some of the functional blocks may be implemented together as a chip. In the above description, LSIs may be replaced with ICs, system LSIs, super LSIs, or ultra-LSIs depending on the degree of integration.

The integration is not limited to the way of using LSIs and may be implemented using a dedicated circuit or a general purpose processor. Alternatively, the integration may be implemented using a field programmable gate array (FPGA) which can be programmed after manufactured as an LSI or a reconfigurable processor in which connections or settings of circuit cells of the LSI are reconfigurable.

Moreover, if another integration technique which can be replaced for LSIs appears by progresses in semiconductor techniques or other derived techniques, it is certain that the functional blocks can be integrated using the integration technique. The likely applications include biological technologies and the like.

SUMMARY OF DISCLOSURE

A radar apparatus of the disclosure is the radar apparatus including a radar transmitter which transmits a radar signal in a predetermined transmission cycle; and a radar receiver which receives a reflection wave signal being a reflection of the radar signal on a target. The radar transmitter includes a phase rotation controller which randomly varies a pattern of a phase rotation amount every period corresponding to a plurality of transmission cycles, the pattern being to be applied to the radar signal within a period; and a transmission phase rotator which assigns a first phase rotation to the radar signal in accordance with the pattern. The radar receiver includes a reception phase rotator which assigns a second phase rotation in a direction opposite to a direction of the first phase rotation to the reflection wave signal in accordance with the pattern.

In the radar apparatus of the disclosure, a difference between phase rotation amounts in patterns different from each other is 0 or $\pi$.

In the radar apparatus of the disclosure, the pattern is based on a pseudo random code.

In the radar apparatus of the disclosure, the phase rotation controller further assigns a phase rotation such that a predetermined phase shift within the plurality of transmission cycles is an integral multiple of $2\pi$.

In the radar apparatus of the disclosure, when a complementary code is used to generate the radar signal, the phase rotation controller assigns phase rotations such that a phase shift is not made within every two transmission cycles where a pair of codes constituting the complementary code are transmitted, but a predetermined phase shift is made between two transmission cycles.

In the radar apparatus of the disclosure, patterns are different between a plurality of radar apparatuses.

In the radar apparatus of the disclosure, the radar transmitter includes a plurality of transmission antennas, and patterns are different between the transmission antennas.

A radar method of the disclosure is the radar method including transmitting a radar signal in a predetermined transmission cycle; and receiving a reflection wave signal being a reflection of the radar signal on a target. In the method, a pattern of a phase rotation amount is randomly varied every period corresponding to a plurality of the radar transmission cycles, the pattern being to be applied to the radar signal within a period; a first phase rotation is assigned to the radar signal in accordance with the pattern; and a second phase rotation in a direction opposite to a direction of the first phase rotation is assigned to the reflection wave signal in accordance with the pattern.

The disclosure is applicable to radar apparatuses detecting a wide range of angle.

What is claimed is:

[1. A radar apparatus, comprising:

a radar transmitter which, in operation, transmits radar signals in a plurality of transmission cycles; and a radar receiver which, in operation, receives reflection wave signals, the reflection wave signals being reflections of the radar signals on a target, wherein the radar transmitter includes a phase rotation controller which, in operation, assigns a unit phase rotation amount every $N_e$ transmission cycles of the plurality of transmission cycles, and generates a phase rotation amount change signal that controls a phase rotation amount, $N_e$ being an integer greater than one, the phase rotation amount of the phase rotation amount change signal being constant within each of the plurality of transmission cycles, the phase rotation amount of the phase rotation amount change signal being changed within the $N_e$ transmission cycles according to the unit phase rotation amount and a predetermined pattern, and a transmission phase rotator which, in operation, assigns first phase rotations to the radar signals in accordance with the phase rotation amount change signal, and the radar receiver includes a reception phase rotator which, in operation, assigns second phase rotations, which are in directions opposite to directions of the first phase rotations, to the reflection wave signals in accordance with the phase rotation amount change signal.]

[2. The radar apparatus according to claim 1, wherein a difference between phase rotation amounts in patterns different from each other is 0 or $\pi$.]

[3. The radar apparatus according to claim 1, wherein the predetermined pattern is based on a pseudo random code.]

[4. The radar apparatus according to claim 1, wherein a total phase shift amount of the phase rotation amount change signal within $N_e$ transmission cycles is an integral multiple of $2\pi$.]

[5. The radar apparatus according to claim 4, wherein, a complementary code is used to generate the radar signals, and the phase rotation controller, in operation, assigns phase rotations such that a phase shift is not made within every two transmission cycles where a pair of codes constituting the complementary code are transmitted, and a predetermined phase shift is made between two transmission cycles.]

[6. The radar apparatus according to claim 1, wherein predetermined pattern is different between a plurality of radar apparatuses.]

[7. The radar apparatus according to claim 1, wherein the radar transmitter includes a plurality of transmission antennas, and the predetermined pattern is different between the transmission antennas.]

[8. A radar method, comprising:

transmitting radar signals in a plurality of transmission cycles; and receiving reflection wave signals, the reflection wave signals being reflections of the radar signals on a target, wherein transmitting the radar signals includes:

assigning a unit phase rotation amount every $N_e$ transmission cycles of the plurality of transmission cycles, and generating a phase rotation amount change signal that controls a phase rotation amount, and assigning first phase rotations to the radar signals in accordance with the phase rotation amount change signal, $N_e$ being an integer greater than one, the phase rotation amount of the phase rotation amount change signal being constant within each of the plurality of transmission cycles, the phase rotation amount of the phase rotation amount change signal being changed within the $N_e$ transmission cycles according to the unit phase rotation amount and a predetermined pattern, and receiving the reflection wave signals includes:

assigning second phase rotations, which are in directions opposite to directions of the first phase rotations, to the reflection wave signals in accordance with the phase rotation amount change signal.]

[9. The radar apparatus according to claim 1, wherein the phase rotation controller, in operation, changes the predetermined pattern every $N_e$ transmission cycles.]

*10. A radar apparatus, comprising:*

*a radar transmitting circuitry; and*

*a radar receiving circuitry, wherein*

*the radar transmitting circuitry includes:*

*a transmission signal generating circuitry which, in operation, generates code division multiplexed signals obtained by code division multiplexing of a plurality of radar signals, and*

*a transmission array antenna including a plurality of transmission antennas which, in operation, transmits the code division multiplexed signals at each of a plurality of transmission periods;*

*the radar receiving circuitry includes:*

*a receiving array antenna including a plurality of receiving antennas which, in operation, receives a reflected wave signal reflected at a target of at least one or more of the code division multiplexed signals; and*

*a receiving signal processing circuitry which, in operation, outputs a distance to the target based on the reflected wave signal; and*

*the transmission signal generating circuitry includes:*

*a phase rotation control circuitry which, in operation, outputs a phase rotation amount equal to an integer multiple of $2\Pi$, where the integer is two or more, for each transmission period by using a sequence of phase variable patterns showing a pattern of phase rotation for each of the plurality of transmission periods; and*

*a transmission phase rotating circuitry which, in operation, assigns the phase rotation amount to each of the code division multiplexed signals at each of the plurality of transmission periods.*

*11. The radar apparatus according to claim 10, wherein the sequence of phase variable patterns is different from each other for the code division multiplexed signals.*

*12. The radar apparatus according to claim 10, wherein the transmission signal generating circuitry includes:*

*a code generation circuitry which, in operation, outputs a code sequence constituting each of the plurality of radar signals, and*

*the phase rotation control circuitry, in operation, outputs a phase rotation amount that sets a phase shift amount to zero for any one of codes composed of the code sequence.*

*13. A radar method, comprising:*

*generating code division multiplexed signals obtained by code division multiplexing of a plurality of radar signals; and*

*transmitting, by a transmission array antenna including a plurality of transmission antennas, the code division multiplexed signals at each of a plurality of transmission periods; and*

*receiving, by a receiving array antenna including a plurality of receiving antennas, a reflected wave signal reflected at a target of at least one or more of the code division multiplexed signals; and*

*outputting a distance to the target based on the reflected wave signal,*

*wherein each of the code division multiplexed signals are assigned a phase rotation amount at each of the plurality of transmission periods, and*

*the phase rotation amount is equal to an integer multiple of 2Π, where the integer is two or more, for each transmission period by using a sequence of phase variable patterns showing a pattern of phase rotation for each of the plurality of transmission periods.*

*14. The radar method according to claim 13, wherein*

*the sequence of phase variable patterns is different from each other for the code division multiplexed signals.*

*15. The radar method according to claim 13, wherein each of the plurality of radar signals is composed of a code sequence, and any one of codes in the code sequence has a phase shift amount set to zero.*

* * * * *